US011638261B2

(12) United States Patent
Basu Mallick et al.

(10) Patent No.: US 11,638,261 B2
(45) Date of Patent: *Apr. 25, 2023

(54) ALLOCATION OF RADIO RESOURCES FOR VEHICULAR COMMUNICATION

(71) Applicant: Panasonic Intellectual Property Corporation of America, Torrance, CA (US)

(72) Inventors: Prateek Basu Mallick, Hessen (DE); Joachim Loehr, Hessen (DE); Hidetoshi Suzuki, Kanagawa (JP); Lilei Wang, Beijing (CN)

(73) Assignee: Panasonic Intellectual Property Corporation of America, Torrance, CA (US)

(*) Notice: Subject to any disclaimer, the term of this patent is extended or adjusted under 35 U.S.C. 154(b) by 89 days.

This patent is subject to a terminal disclaimer.

(21) Appl. No.: 17/221,303

(22) Filed: Apr. 2, 2021

(65) Prior Publication Data

US 2021/0250939 A1 Aug. 12, 2021

Related U.S. Application Data

(63) Continuation of application No. 17/031,382, filed on Sep. 24, 2020, now Pat. No. 10,999,851, which is a (Continued)

(51) Int. Cl.
*H04W 72/04* (2009.01)
*H04W 72/02* (2009.01)
(Continued)

(52) U.S. Cl.
CPC ......... *H04W 72/048* (2013.01); *H04W 64/00* (2013.01); *H04W 72/02* (2013.01); *H04W 84/042* (2013.01)

(58) Field of Classification Search
CPC ... H04W 72/02; H04W 72/048; H04W 36/14; H04W 4/029; H04W 4/023; H04W 72/04;
(Continued)

(56) References Cited

U.S. PATENT DOCUMENTS 5,613,205 A 3/1997 Dufour
9,730,187 B2 8/2017 Park et al.
(Continued)

FOREIGN PATENT DOCUMENTS

CN 102958066 A 3/2013
CN 103841649 A 6/2014
(Continued)

OTHER PUBLICATIONS

3GPP TR 21.905 V13.0.0, "3$^{rd}$ Generation Partnership Project; Technical Specification Group Services and System Aspects; Vocabulary for 3GPP Specification (Release 13)," Dec. 2015, 64 pages.
(Continued)

*Primary Examiner* — Matthew C Sams
(74) *Attorney, Agent, or Firm* — Seed IP Law Group LLP

(57) ABSTRACT

The invention relates to an improved radio resource allocation performed by a vehicular mobile terminal. The vehicular mobile terminal determines whether to determine radio resources based on the location of the vehicular mobile terminal or not, based on information received from an entity of the communication system. In case the radio resources are to be selected based on the location of the vehicular mobile terminal, the vehicular mobile terminal determines the location of the vehicular mobile terminal, and determines radio resources for communication with at least the second mobile terminal, based on the determined location of the vehicular mobile terminal.

11 Claims, 7 Drawing Sheets

Related U.S. Application Data continuation of application No. 16/088,004, filed as application No. PCT/CN2016/077312 on Mar. 25, 2016, now Pat. No. 10,827,502.

(51) Int. Cl.
  *H04W 64/00* (2009.01)
  *H04W 84/04* (2009.01)
(58) Field of Classification Search
  CPC ............. H04W 64/00; H04W 36/0077; H04W 72/0413; H04W 72/042; H04W 72/0446; H04W 72/0453; H04W 72/1257; H04W 74/0833; H04W 8/005; H04W 84/042; H04W 84/18
  See application file for complete search history.

(56) References Cited

U.S. PATENT DOCUMENTS

| | | | |
|---|---|---|---|
| 10,827,502 B2* | 11/2020 | Basu Mallick | ....... H04W 72/02 |
| 10,999,851 B2* | 5/2021 | Basu Mallick | ....... H04W 64/00 |
| 2009/0275332 A1 | 11/2009 | Niska et al. | |
| 2012/0134336 A1 | 5/2012 | Nakaya et al. | |
| 2013/0165142 A1 | 6/2013 | Huang | |
| 2013/0288645 A1 | 10/2013 | Zheng | |
| 2015/0382324 A1 | 12/2015 | Sheng et al. | |
| 2016/0295589 A1 | 10/2016 | Nikopour et al. | |
| 2017/0041916 A1 | 2/2017 | Soret et al. | |
| 2019/0116586 A1* | 4/2019 | Basu Mallick | ....... H04W 64/00 |
| 2021/0007097 A1* | 1/2021 | Basu Mallick | ....... H04W 64/00 |

FOREIGN PATENT DOCUMENTS

| | | |
|---|---|---|
| CN | 105430751 A | 3/2016 |
| CN | 108886767 A | 11/2018 |
| DE | 10 2009 008 241 A1 | 8/2010 |
| EP | 2 830 343 A1 | 1/2015 |
| GB | 2499411 A | 8/2013 |
| RU | 2 150 793 C1 | 6/2000 |
| WO | WO2010/113219 A1 | 10/2010 |

OTHER PUBLICATIONS

3GPP TR 22.885 V14.0.0, "3$^{rd}$ Generation Partnership Project; Technical Specification Group Services and System Aspects; Study on LTE support for Vehicle to Everything (V2X) services (Release 14)," Dec. 2015, 50 pages.
3GPP TR 23.713 V13.0.0, 3$^{rd}$ Generation Partnership Project; Technical Specification Group Services and System Aspects; Study on extended architecture support for proximity-based services (Release 13), Sep. 2015, 80 pages.
3GPP TR 36.885 V1.0.0, "3$^{rd}$ Generation Partnership Project; Technical Specification Group Radio Access Network; Study on LTE-based V2X Services; (Release 14)," Mar. 2016, 88 pages.
3GPP TS 23.303 V13.2.0, "3$^{rd}$ Generation Partnership Project; Technical Specification Group Services and System Aspects; Proximity-based services (ProSe); Stage 2 (Release 13)," Dec. 2015, 122 pages.
3GPP TS 36.211 V13.0.0, "3$^{rd}$ Generation Partnership Project; Technical Specification Group Radio Access Network; Evolved Universal Terrestrial Radio Access (E-UTRA); Physical channels and modulation (Release 13)," Dec. 2015, 141 pages.
3GPP TS 36.212 V13.0.0, "3$^{rd}$ Generation Partnership Project; Technical Specification Group Radio Access Network; Evolved Universal Terrestrial Radio Access (E-UTRA); Multiplexing and channel coding (Release 13)," Dec. 2015, 121 pages.
3GPP TS 36.213 V13.0.0, "3$^{rd}$ Generation Partnership Project; Technical Specification Group Radio Access Network; Evolved Universal Terrestrial Radio Access (E-UTRA); Physical layer procedures (Release 13)," Dec. 2015, 326 pages.
3GPP TS 36.300 V13.2.0, "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Dec. 2015, 290 pages.
3GPP TS 36.321 V13.0.0, "3$^{rd}$ Generation Partnership Project; Technical Specification Group Radio Access Network; Evolved Universal Terrestrial Radio Access (E-UTRA); Medium Access Control (MAC) protocol specification (Release 13)," Dec. 2015, 82 pages.
Beijing Xinwei Telecom Techn., "Discussion on enhancement of V2X resource allocation," R1-157534, Agenda item 6.2.8.1.1, 3GPP TSG RAN WG1 Meeting #83, Anaheim, USA, Nov. 15-22, 2015, 8 pages.
Extended European Search Report, dated Feb. 11, 2019, for corresponding European Application No. 16894906.3-1215 / 3434050, 6 pages.
General Motors, "Geo Based Resource Scheduling for V2V Communication," R1-161031, Agenda Item: 7.3.2.2.1, 3GPP TSG RAN WG1 Meeting #84, St Julian's, Malta, Feb. 15-19, 2016, 5 pages.
Huawei, HiSilicon, "UE autonomous resource selection," R1-160307, Agenda Item: 7.3.2.2.1, 3GPP TSG RAN WG1 Meeting #84, St Julian's, Malta, Feb. 15-19, 2016, 6 pages.
Intel Corporation, "Support of geo-based transmission schemes for V2V communication," R1-160431, Agenda item 7.3.2.2.1, 3GPP TSG RAN WG1 Meeting #84, St. Julian's, Malta, Feb. 15-19, 2016, 9 pages.
International Search Report, dated Dec. 22, 2016, for corresponding International Application No. PCT/CN2016/077312, 2 pages.
Japanese Office Action, dated Dec. 3, 2019, for Japanese Application No. 2018-549795, 7 pages. (with English translation).
LG Electronics, "Discussion on enhancement for PC5 based V2V resource allocation," R1-156891, Agenda item: 6.2.8.1.1, 3GPP TSG RAN WG1 Meeting #83, Anaheim, USA, Nov. 15-22, 2015, 8 pages.
LG Electronics, "Discussion on enhancement for PC5 based V2V resource allocation," R1-157435, Agenda item: 6.2.8.1.1, 3GPP TSG RAN WG1 Meeting #83, Anaheim, USA, Nov. 15-22, 2015, 18 pages.
RAN WG1, "LS on resource allocation principles in PC5-based V2V," R1-156314, 3GPP RAN WG1 Meeting #82bis, Malmö, Sweden, Oct. 5-9, 2015, 3 pages.
Russian Office Action, dated Jul. 12, 2019, for Russian Application No. 2018133576, 9 pages. (with English translation).
Russian Search Report, dated Jul. 12, 2019, for Russian Application No. 2018133576, 4 pages. (with English translation).
Sony, "PC5 enhancements on resource allocation for V2V Services," R1-156709, Agenda Item: 6.2.8.1.1, 3GPP TSG RAN WG1 Meeting #83, 5 pages.
Sony, "Location based resource selection on LTE sidelink for V2V services," R1-160678, Agenda Item: 7.3.2.2.1, 3GPP TSG RAN WG1 Meeting #84, St Julian's, Malta, Feb. 15-19, 2016, 3 pages.
General Motors, "Geo Based Resource Scheduling for V2V Communication," R1-161195, Agenda Item: 7.3.2.2.1, 3GPP TSG RAN WG1 Meeting #84, St Julian's, Malta, Feb. 15-19, 2016. (5 pages).
Korean Office Action, dated Oct. 31, 2022, for Korean Patent Application No. 10-2018-7027745. (10 pages) (with English Translation).

* cited by examiner

ALLOCATION OF RADIO RESOURCES FOR VEHICULAR COMMUNICATION

BACKGROUND

Technical Field

The present disclosure relates to improved allocation of radio resources for a vehicular mobile terminal. The present disclosure is providing the corresponding vehicular mobile terminal, the radio base station, the system, and method.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N_{RB}^{DL} N_{sc}^{RB}$ subcarriers and $N_{symb}^{DL}$ OFDM symbols. $N_{RB}^{DL}$ is the number of resource blocks within the bandwidth. The quantity $N_{RB}^{DL}$ depends on the downlink transmission bandwidth configured in the cell and shall fulfill $N_{RB}^{min,DL} \leq N_{RB}^{DL} \leq N_{RB}^{max,DL}$ where $N_{RB}^{min,DL}=6$ and $N_{RB}^{max,DL}=110$ are respectively the smallest and the largest downlink bandwidths, supported by the current version of the specification. $N_{sc}^{RB}$ is the number of subcarriers within one resource block. For normal cyclic prefix subframe structure, $N_{sc}^{RB}=12$ and $N_{symb}^{DL}=7$.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", current version 13.0.0, section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

MAC Layer/Entity, RRC Layer, Physical Layer The LTE layer 2 user-plane/control-plane protocol stack comprises four sublayers, RRC, PDCP, RLC and MAC. The Medium Access Control (MAC) layer is the lowest sublayer in the Layer 2 architecture of the LTE radio protocol stack and is defined by, e.g., the 3GPP technical standard TS 36.321, current version 13.0.0. The connection to the physical layer below is through transport channels, and the connection to the RLC layer above is through logical channels. The MAC layer therefore performs multiplexing and demultiplexing between logical channels and transport channels: the MAC layer in the transmitting side constructs MAC PDUs, known as transport blocks, from MAC SDUs received through logical channels, and the MAC layer in the receiving side recovers MAC SDUs from MAC PDUs received through transport channels.

The MAC layer provides a data transfer service (see subclauses 5.4 and 5.3 of TS 36.321 incorporated herein by reference) for the RLC layer through logical channels, which are either control logical channels which carry control data (e.g., RRC signaling) or traffic logical channels which carry user plane data. On the other hand, the data from the MAC layer is exchanged with the physical layer through transport channels, which are classified as downlink or uplink. Data is multiplexed into transport channels depending on how it is transmitted over the air.

The Physical layer is responsible for the actual transmission of data and control information via the air interface, i.e., the Physical Layer carries all information from the MAC transport channels over the air interface on the transmission side. Some of the important functions performed by the Physical layer include coding and modulation, link adaptation (AMC), power control, cell search (for initial synchronization and handover purposes) and other measurements (inside the LTE system and between systems) for the RRC layer. The Physical layer performs transmissions based on transmission parameters, such as the modulation scheme, the coding rate (i.e., the modulation and coding scheme, MCS), the number of physical resource blocks, etc. More information on the functioning of the physical layer can be found in the 3GPP technical standard 36.213 current version 13.0.0, incorporated herein by reference.

The Radio Resource Control (RRC) layer controls communication between a UE and an eNB at the radio interface and the mobility of a UE moving across several cells. The RRC protocol also supports the transfer of NAS information. For UEs in RRC_IDLE, RRC supports notification from the network of incoming calls. RRC connection control covers all procedures related to the establishment, modification and release of an RRC connection, including paging, measurement configuration and reporting, radio resource configuration, initial security activation, and establishment of Signaling Radio Bearer (SRBs) and of radio bearers carrying user data (Data Radio Bearers, DRBs).

The radio link control (RLC) sublayer comprises mainly ARQ functionality and supports data segmentation and concatenation, i.e., RLC layer performs framing of RLC SDUs to put them into the size indicated by the MAC layer. The latter two minimize the protocol overhead independently from the data rate. The RLC layer is connected to the MAC layer via logical channels. Each logical channel transports different types of traffic. The layer above RLC layer is typically the PDCP layer, but in some cases it is the RRC layer, i.e., RRC messages transmitted on the logical channels BCCH (Broadcast Control Channel), PCCH (Paging Control Channel) and CCCH (Common Control Channel) do not require security protection and thus go directly to the RLC layer, bypassing the PDCP layer. The main services and functions of the RLC sublayer include:

Transfer of upper layer PDUs supporting AM, UM or TM data transfer;
Error Correction through ARQ;
Segmentation according to the size of the TB;
Resegmentation when necessary (e.g., when the radio quality, i.e., the supported TB size changes);
Concatenation of SDUs for the same radio bearer is FFS;
In-sequence delivery of upper layer PDUs;
Duplicate Detection;
Protocol error detection and recovery;
SDU discard;
Reset.

The ARQ functionality provided by the RLC layer will be discussed in more detail at a later part.

Uplink Access Scheme for LTE

For uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and improved coverage (higher data rates for a given terminal peak power). During each time interval, eNodeB assigns users a unique time/frequency resource for transmitting user data, thereby ensuring intra-cell orthogonality. An orthogonal access in the uplink promises increased spectral efficiency by eliminating intra-cell interference. Interference due to multipath propagation is handled at the base station (eNodeB), aided by insertion of a cyclic prefix in the transmitted signal.

The basic physical resource used for data transmission consists of a frequency resource of size BWgrant during one time interval, e.g., a subframe, onto which coded information bits are mapped. It should be noted that a subframe, also referred to as transmission time interval (TTI), is the smallest time interval for user data transmission. It is however possible to assign a frequency resource BWgrant over a longer time period than one TTI to a user by concatenation of subframes.

Layer 1/Layer 2 Control Signaling

In order to inform the scheduled users about their allocation status, transport format, and other transmission-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. Several PDCCHs can be transmitted in one subframe.

Generally, the information sent in the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;

Resource allocation information, indicating the resources (e.g., Resource Blocks, RBs) on which a user is allocated. Alternatively, this information is termed resource block assignment (RBA). Note, that the number of RBs on which a user is allocated can be dynamic;

Carrier indicator, which is used if a control channel transmitted on a first carrier assigns resources that concern a second carrier, i.e., resources on a second carrier or resources related to a second carrier; (cross carrier scheduling);

Modulation and coding scheme that determines the employed modulation scheme and coding rate;

HARQ information, such as a new data indicator (NDI) and/or a redundancy version (RV) that is particularly useful in retransmissions of data packets or parts thereof, Power control commands to adjust the transmit power of the assigned uplink data or control information transmission;

Reference signal information such as the applied cyclic shift and/or orthogonal cover code index, which are to be employed for transmission or reception of reference signals related to the assignment;

Uplink or downlink assignment index that is used to identify an order of assignments, which is particularly useful in TDD systems;

Hopping information, e.g., an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in their fields as mentioned above. The different DCI formats that are currently defined for LTE are as follows and described in detail in 3GPP TS 36.212, "Multiplexing and channel coding", section 5.3.3.1 (current version v13.0.0 available at http://www.3gpp.org and incorporated herein by reference). For instance, the following DCI Formats can be used to carry a resource grant for the uplink.

Format 0: DCI Format 0 is used for the transmission of resource grants for the PUSCH, using single-antenna port transmissions in uplink transmission mode 1 or 2.

Format 4: DCI format 4 is used for the scheduling of the PUSCH, using closed-loop spatial multiplexing transmissions in uplink transmission mode 2.

The 3GPP technical standard TS 36.212, current version 13.0.0, defines in subclause 5.4.3, incorporated herein by reference, control information for the sidelink.

LTE Device to Device (D2D) Proximity Services (ProSe)

Proximity-based applications and services represent an emerging social-technological trend. The identified areas include services related to commercial services and Public Safety that would be of interest to operators and users. The introduction of a Proximity Services (ProSe) capability in LTE would allow the 3GPP industry to serve this developing market and will, at the same time, serve the urgent needs of several Public Safety communities that are jointly committed to LTE.

Device-to-Device (D2D) communication is a technology component introduced by LTE-Rel.12, which allows D2D as an underlay to the cellular network to increase the spectral efficiency. For example, if the cellular network is LTE, all data-carrying physical channels use SC-FDMA for D2D signaling. In D2D communications, user equipments transmit data signals to each other over a direct link using the cellular resources instead of through the radio base station. Throughout the disclosure the terms "D2D", "ProSe" and "sidelink" are interchangeable.

The D2D communication in LTE is focusing on two areas: Discovery and Communication.

ProSe (Proximity-based Services) Direct Discovery is defined as the procedure used by the ProSe-enabled UE to discover other ProSe-enabled UE(s) in its proximity using E-UTRA direct radio signals via the PC5 interface.

In D2D communication, UEs transmit data signals to each other over a direct link using the cellular resources instead of through the base station (BS). D2D users communicate directly while remaining controlled under the BS, i.e., at least when being in coverage of an eNB. Therefore, D2D can improve system performance by reusing cellular resources.

It is assumed that D2D operates in the uplink LTE spectrum (in the case of FDD) or uplink sub-frames of the cell giving coverage (in case of TDD), except when out of coverage). Furthermore, D2D transmission/reception does not use full duplex on a given carrier. From individual UE perspective, on a given carrier D2D signal reception and LTE uplink transmission do not use full duplex, i.e., no simultaneous D2D signal reception and LTE UL transmission is possible.

In D2D communication, when one particular UE1 has a role of transmission (transmitting user equipment or transmitting terminal), UE1 sends data, and another UE2 (receiving user equipment) receives it. UE1 and UE2 can change their transmission and reception role. The transmission from UE1 can be received by one or more UEs like UE2.

ProSe Direct Communication Layer-2 Link

In brief, ProSe direct one-to-one communication is realized by establishing a secure layer-2 link over PC5 between two UEs. Each UE has a Layer-2 ID for unicast communication that is included in the Source Layer-2 ID field of every frame that it sends on the layer-2 link and in the Destination Layer-2 ID of every frame that it receives on the layer-2 link. The UE needs to ensure that the Layer-2 ID for unicast communication is at least locally unique. So the UE should be prepared to handle Layer-2 ID conflicts with adjacent UEs using unspecified mechanisms (e.g., selfassign a new Layer-2 ID for unicast communication when a conflict is detected). The layer-2 link for ProSe direct communication one-to-one is identified by the combination of the Layer-2 IDs of the two UEs. This means that the UE can engage in multiple layer-2 links for ProSe direct communication one-to-one using the same Layer-2 ID.

ProSe direct communication one-to-one is composed of the following procedures as explained in detail in TR 23.713 current version v13.0.0 section 7.1.2 incorporated herein by reference:

Establishment of a secure layer-2 link over PC5.
IP address/prefix assignment.
Layer-2 link maintenance over PC5.
Layer-2 link release over PC5.

FIG. 3 illustrates how to establish a secure layer-2 link over the PC5 interface.

1. UE-1 sends a Direct Communication Request message to UE-2 in order to trigger mutual authentication. The link initiator (UE-1) needs to know the Layer-2 ID of the peer (UE-2) in order to perform step 1. As an example, the link initiator may learn the Layer-2 ID of the peer by executing a discovery procedure first or by having participated in ProSe one-to-many communication including the peer.
2. UE-2 initiates the procedure for mutual authentication. The successful completion of the authentication procedure completes the establishment of the secure layer-2 link over PC5.

UEs engaging in isolated (non-relay) one-to-one communication may also use link-local addresses. The PC5 Signaling Protocol shall support keep-alive functionality that is used to detect when the UEs are not in ProSe Communication range, so that they can proceed with implicit layer-2 link release. The Layer-2 link release over the PC5 can be performed by using a Disconnect Request message transmitted to the other UE, which also deletes all associated context data. Upon reception of the Disconnect Request message, the other UE responds with a Disconnect Response message and deletes all context data associated with the layer-2 link.

ProSe Direct Communication Related Identities

3GPP TS 36.300, current version 13.2.0, defines in subclause 8.3 the following identities to use for ProSe Direct Communication:

SL-RNTI: Unique identification used for ProSe Direct Communication Scheduling;
Source Layer-2 ID: Identifies the sender of the data in sidelink ProSe Direct Communication. The Source Layer-2 ID is 24 bits long and is used together with ProSe Layer-2 Destination ID and LCID for identification of the RLC UM entity and PDCP entity in the receiver;
Destination Layer-2 ID: Identifies the target of the data in sidelink ProSe Direct Communication. The Destination Layer-2 ID is 24 bits long and is split in the MAC layer into two bit strings:
One bit string is the LSB part (8 bits) of Destination Layer-2 ID and forwarded to the physical layer as Sidelink Control Layer-1 ID. This identifies the target of the intended data in Sidelink Control and is used for filtering packets at the physical layer.
Second bit string is the MSB part (16 bits) of the Destination Layer-2 ID and is carried within the MAC header. This is used for filtering packets at the MAC layer.

No Access Stratum signaling is required for group formation and to configure Source Layer-2 ID, Destination Layer-2 ID and Sidelink Control L1 ID in the UE. These identities are either provided by a higher layer or derived from identities provided by a higher layer. In case of groupcast and broadcast, the ProSe UE ID provided by the higher layer is used directly as the Source Layer-2 ID, and the ProSe Layer-2 Group ID provided by the higher layer is used directly as the Destination Layer-2 ID in the MAC layer. In case of one-to-one communications, higher layer provides Source Layer-2 ID and Destination Layer-2 ID.

Radio Resource Allocation for Proximity Services

From the perspective of a transmitting UE, a Proximity-Services-enabled UE (ProSe-enabled UE) can operate in two modes for resource allocation:

Mode 1 refers to the eNB-scheduled resource allocation, where the UE requests transmission resources from the eNB (or Release-10 relay node), and the eNodeB (or Release-10 relay node) in turn schedules the resources used by a UE to transmit direct data and direct control information (e.g., Scheduling Assignment). The UE needs to be RRC_CONNECTED in order to transmit data. In particular, the UE sends a scheduling request (D-SR or Random Access) to the eNB followed by a buffer status report (BSR) in the usual manner (see also following chapter "Transmission procedure for D2D communication"). Based on the BSR, the eNB can determine that the UE has data for a ProSe Direct Communication transmission and can estimate the resources needed for transmission.

On the other hand, Mode 2 refers to the UE-autonomous resource selection, where a UE on its own selects resources (time and frequency) from resource pool(s) to transmit direct data and direct control information (i.e., SA). One resource pool is defined, e.g., by the content of SIB18, namely by the field commTxPoolNormalCommon, this particular resource pool being broadcast in the cell and then commonly available for all UEs in the cell still in RRC_Idle state. Effectively, the eNB may define up to four different instances of said pool, respectively four resource pools for the transmission of SA messages and direct data. However, in Rel-12 a UE shall always use the first resource pool defined in the list, even if it was configured with multiple resource pools. This restriction was removed for Rel-13, i.e., a UE can transmit on multiple of the configured resource pools within one SC period. How the UE selects the resource pools for transmission is further outlined below (further specified in TS36.321).

As an alternative, another resource pool can be defined by the eNB and signaled in SIB18, namely by using the field commTxPoolExceptional, which can be used by the UEs in exceptional cases.

What resource allocation mode a UE is going to use is configurable by the eNB. Furthermore, what resource allocation mode a UE is going to use for D2D data communication may also depend on the RRC state, i.e., RRC_IDLE or RRC_CONNECTED, and the coverage state of the UE, i.e., in-coverage, out-of-coverage. A UE is considered in-coverage if it has a serving cell (i.e., the UE is RRC_CONNECTED or is camping on a cell in RRC_IDLE).

The following rules with respect to the resource allocation mode apply for the UE:

If the UE is out-of-coverage, it can only use Mode 2;
If the UE is in-coverage, it may use Mode 1 if the eNB configures it accordingly;
If the UE is in-coverage, it may use Mode 2 if the eNB configures it accordingly;
When there are no exceptional conditions, UE may change from Mode 1 to Mode 2 or vice-versa only if it is configured by eNB to do so. If the UE is in-coverage, it shall use only the mode indicated by eNB configuration unless one of the exceptional cases occurs;

The UE considers itself to be in exceptional conditions, e.g., while T311 or T301 is running;

When an exceptional case occurs the UE is allowed to use Mode 2 temporarily even though it was configured to use Mode 1.

While being in the coverage area of an E-UTRA cell, the UE shall perform ProSe Direct Communication Transmission on the UL carrier only on the resources assigned by that cell, even if resources of that carrier have been pre-configured, e.g., in UICC (Universal Integrated Circuit Card).

For UEs in RRC_IDLE the eNB may select one of the following options:

The eNB may provide a Mode 2 transmission resource pool in SIB. UEs that are authorized for ProSe Direct Communication use these resources for ProSe Direct Communication in RRC_IDLE;

The eNB may indicate in SIB that it supports D2D but does not provide resources for ProSe Direct Communication. UEs need to enter RRC_CONNECTED to perform ProSe Direct Communication transmission.

For UEs in RRC_CONNECTED:

A UE in RRC_CONNECTED that is authorized to perform ProSe Direct Communication transmission, indicates to the eNB that it wants to perform ProSe Direct Communication transmissions when it needs to perform ProSe Direct Communication transmission;

The eNB validates whether the UE in RRC_CONNECTED is authorized for ProSe Direct Communication transmission using the UE context received from MME;

The eNB may configure a UE in RRC_CONNECTED by dedicated signaling with a Mode-2 resource allocation transmission resource pool that may be used without constraints while the UE is RRC_CONNECTED. Alternatively, the eNB may configure a UE in RRC_CONNECTED by dedicated signaling with a Mode 2 resource allocation transmission resource pool which the UE is allowed to use only in exceptional cases and rely on Mode 1 otherwise.

The resource pool for Scheduling Assignment when the UE is out of coverage can be configured as below:

The resource pool used for reception is pre-configured.

The resource pool used for transmission is pre-configured.

The resource pool for Scheduling Assignment when the UE is in coverage can be configured as below:

The resource pool used for reception is configured by the eNB via RRC, in dedicated or broadcast signaling.

The resource pool used for transmission is configured by the eNB via RRC if Mode 2 resource allocation is used The SCI (Sidelink Control Information) resource pool (also referred to as Scheduling Assignment, SA, resource pool) used for transmission is not known to the UE if Mode 1 resource allocation is used.

The eNB schedules the specific resource(s) to use for Sidelink Control Information (Scheduling Assignment) transmission if Mode 1 resource allocation is used. The specific resource assigned by the eNB is within the resource pool for reception of SCI that is provided to the UE.

FIG. 4 illustrates the use of transmission/reception resources for overlay (LTE) and underlay (D2D) system.

Basically, the eNodeB controls whether UE may apply the Mode 1 or Mode 2 transmission. Once the UE knows its resources where it can transmit (or receive) D2D communication, it uses the corresponding resources only for the corresponding transmission/reception. For example, in FIG. 4 the D2D subframes will only be used to receive or transmit the D2D signals. Since the UE as a D2D device would operate in Half Duplex mode, it can either receive or transmit the D2D signals at any point of time. Similarly, the other subframes illustrated in FIG. 4 can be used for LTE (overlay) transmissions and/or reception.

Transmission Procedure for D2D Communication

The D2D data transmission procedure differs depending on the resource allocation mode. As described above for Mode 1, the eNB explicitly schedules the resources for the Scheduling Assignment and the D2D data communication after a corresponding request from the UE. Particularly, the UE may be informed by the eNB that D2D communication is generally allowed, but that no Mode 2 resources (i.e., resource pool) are provided; this may be done, e.g., with the exchange of the D2D communication Interest Indication by the UE and the corresponding response, D2D Communication Response, where the corresponding exemplary ProseCommConfig information element would not include the commTxPoolNormalCommon, meaning that a UE that wants to start direct communication involving transmissions has to request E-UTRAN to assign resources for each individual transmission. Thus, in such a case, the UE has to request the resources for each individual transmission, and in the following the different steps of the request/grant procedure are exemplarily listed for this Mode 1 resource allocation:

Step 1: UE sends SR (Scheduling Request) to eNB via PUCCH;

Step 2: eNB grants UL resource (for UE to send BSR) via PDCCH, scrambled by C-RNTI;

Step 3: UE sends D2D BSR indicating the buffer status via PUSCH;

Step 4: eNB grants D2D resource (for UE to send data) via PDCCH, scrambled by D2D-RNTI.

Step 5: D2D Tx UE transmits SA/D2D data according to grant received in step 4.

A Scheduling Assignment (SA), also termed SCI (Sidelink Control Information) is a compact (low-payload) message containing control information, e.g., pointer(s) to time-frequency resources, modulation and coding scheme and Group Destination ID for the corresponding D2D data transmission. An SCI transports the sidelink scheduling information for one (ProSE) destination ID. The content of the SA (SCI) is basically in accordance with the grant received in Step 4 above. The D2D grant and SA content (i.e., SCI content) are defined in the 3GPP technical standard 36.212, current version 13.0.0, subclause 5.4.3, incorporated herein by reference, defining in particular the SCI format 0 (see content of SCI format 0 above).

On the other hand, for Mode 2 resource allocation, above steps 1-4 are basically not necessary, and the UE autonomously selects resources for the SA and D2D data transmission from the transmission resource pool(s) configured and provided by the eNB.

FIG. 5 exemplarily illustrates the transmission of the Scheduling Assignment and the D2D data for two UEs, UE-1 and UE-2, where the resources for sending the scheduling assignments are periodic, and the resources used for the D2D data transmission are indicated by the corresponding Scheduling Assignment.

FIG. 6 illustrates the D2D communication timing for Mode 2, autonomous scheduling, during one SA/data period, also known as SC period, Sidelink Control period. FIG. 7 illustrates the D2D communication timing for Mode 1, eNB-scheduled allocation during one SA/data period. A SC period is the time period consisting of transmission of a Scheduling Assignment and its corresponding data. As can be seen from FIG. 6, the UE transmits after an SA-offset time, a Scheduling Assignment using the transmission pool resources for scheduling assignments for Mode 2, SA_Mode2_Tx_pool. The 1st transmission of the SA is followed, e.g., by three retransmissions of the same SA message. Then, the UE starts the D2D data transmission, i.e., more in particular the T-RPT bitmap/pattern, at some configured offset (Mode2data_offset) after the first subframe of the SA resource pool (given by the SA_offset). One D2D data transmission of a MAC PDU (i.e., a transport block) consists of its 1st initial transmission and several retransmissions. For the illustration of FIG. 6 (and of FIG. 7) it is assumed that three retransmissions are performed (i.e., 2nd, 3rd, and 4th transmission of the same MAC PDU). The Mode2 T-RPT Bitmap (time resource pattern of transmission, T-RPT) basically defines the timing of the MAC PDU transmission (1st transmission) and its retransmissions ($2^{nd}$, $3^{rd}$, and $4^{th}$ transmission). The SA pattern basically defines the timing of the SA's initial transmission and its retransmissions ($2^{nd}$, $3^{rd}$ and $4^{th}$ transmission).

As currently specified in the standard, for one sidelink grant, e.g., either sent by the eNB or selected by the UE itself, the UE can transmit multiple transport blocks, MAC PDUs, (only one per subframe (TTI), i.e., one after the other), however to only one ProSe destination group. Also the retransmissions of one transport block must be finished before the first transmission of the next transport block starts, i.e., only one HARQ process is used per sidelink grant for the transmission of the multiple transport blocks. Furthermore, the UE can have and use several sidelink grants per SC period, but a different ProSe destination be selected for each of them. Thus, in one SC period the UE can transmit data to one ProSe destination only one time.

As apparent from FIG. 7, for the eNB-scheduled resource allocation mode (Mode 1), the D2D data transmission, i.e., more in particular the T-RPT pattern/bitmap, starts in the next UL subframe after the last SA transmission repetition in the SA resource pool. As explained already for FIG. 6, the Mode1 T-RPT Bitmap (time resource pattern of transmission, T-RPT) basically defines the timing of the MAC PDU transmission (1st transmission) and its retransmissions (2nd, 3rd, and 4th transmission).

The sidelink data transmission procedure can be found in the 3GPP standard document TS 36.321 v13.0.0, section 5.14, incorporated herein by reference. Therein, the Mode-2 autonomous resource selection is described in detail, differentiating between being configured with a single radio resource pool or multiple radio resource pools. The following steps are taken from said section of TS 36.321, assuming Mode-2 autonomous resource selection:

In order to transmit on the SL-SCH (sidelink shared channel) the MAC entity must have at least one sidelink grant. Sidelink grants are selected as follows:

If the MAC entity is configured by upper layers to transmit using one or multiple pool(s) of resources and more data is available in STCH (sidelink traffic channel) than can be transmitted in the current SC period, the MAC entity shall for each sidelink grant to be selected:

if configured by upper layers to use a single pool of resources:
        select that pool of resources for use;
    else, if configured by upper layers to use multiple pools of resources:
        select a pool of resources for use from the pools of resources configured by upper layers whose associated priority list includes the priority of the highest priority of the sidelink logical channel in the MAC PDU to be transmitted;

NOTE: If more than one pool of resources has an associated priority list which includes the priority of the sidelink logical channel with the highest priority in the MAC PDU to be transmitted, it is left for UE implementation which one of those pools of resources to select.

randomly select the time and frequency resources for SL-SCH and SCI of a sidelink grant from the selected resource pool. The random function shall be such that each of the allowed selections can be chosen with equal probability;
    use the selected sidelink grant to determine the set of subframes in which transmission of SCI and transmission of first transport block occur according to subclause 14.2.1 of TS 36.213 incorporated herein by reference (this step refers to the selection of a T-RPT and a SA pattern, as explained in connection with FIG. 7);
    consider the selected sidelink grant to be a configured sidelink grant occurring in those subframes starting at the beginning of the first available SC Period which starts at least 4 subframes after the subframe in which the sidelink grant was selected;
    clear the configured sidelink grant at the end of the corresponding SC Period;

NOTE: Retransmissions on SL-SCH cannot occur after the configured sidelink grant has been cleared.

NOTE: If the MAC entity is configured by upper layers to transmit using one or multiple pool(s) of resources, it is left for UE implementation how many sidelink grants to select within one SC period taking the number of sidelink processes into account.

The MAC entity shall for each subframe:
    if the MAC entity has a configured sidelink grant occurring in this subframe:
        if the configured sidelink grant corresponds to transmission of SCI:
            instruct the physical layer to transmit SCI corresponding to the configured sidelink grant.
        else if the configured sidelink grant corresponds to transmission of first transport block:
            deliver the configured sidelink grant and the associated HARQ information to the Sidelink HARQ Entity for this subframe.

NOTE: If the MAC entity has multiple configured grants occurring in one subframe and if not all of them can be processed due to the single-cluster SC-FDM restriction, it is left for UE implementation which one of these to process according to the procedure above.

The above text taken from the 3GPP technical standard can be clarified further. For example, the step of randomly selecting the time and frequency resources is random as to which particular time/frequency resources are chosen but is, e.g., not random as to the amount of time/frequency resources selected in total. The amount of resources selected from the resource pool depends on the amount of data that is to be transmitted with said sidelink grant to be selected autonomously. In turn, the amount of data that is to be transmitted depends on the previous step of selecting the ProSe destination group and the corresponding amount of data ready for transmission destined to said ProSe destination group. As described later in the sidelink LCP procedure, the ProSe destination is selected first.

Furthermore, the sidelink process associated with the sidelink HARQ entity is responsible for instructing the physical layer to generate and perform a transmission accordingly, as apparent from section 5.14.1.2.2 of 3GPP TS 36.321 v13.0.0, incorporated herein by reference. In brief, after determining the sidelink grant and the sidelink data to transmit, the physical layer takes care that the sidelink data is actually transmitted, based on the sidelink grant and the necessary transmission parameters.

What is discussed above is the current status of the 3GPP standard for the D2D communication. However, it should be noted that there has been ongoing discussions on how to further improve and enhance the D2D communication which will likely result in that some changes are introduced to the D2D communication in future releases. The present disclosure as will be described later shall be also applicable to those later releases.

ProSe Network Architecture and ProSe Entities

FIG. 8 illustrates a high-level exemplary architecture for a non-roaming case, including different ProSe applications in the respective UEs A and B, as well as a ProSe Application Server and ProSe function in the network. The example architecture of FIG. 8 is taken from TS 23.303 v.13.2.0 chapter 4.2 "Architectural Reference Model" incorporated herein by reference.

The functional entities are presented and explained in detail in TS 23.303 subclause 4.4 "Functional Entities" incorporated herein by reference. The ProSe function is the logical function that is used for network-related actions required for ProSe and plays different roles for each of the features of ProSe. The ProSe function is part of the 3GPP's EPC and provides all relevant network services like authorization, authentication, data handling, etc., related to proximity services. For ProSe direct discovery and communication, the UE may obtain a specific ProSe UE identity, other configuration information, as well as authorization from the ProSe function over the PC3 reference point. There can be multiple ProSe functions deployed in the network, although for ease of illustration a single ProSe function is presented. The ProSe function consists of three main sub-functions that perform different roles depending on the ProSe feature: Direct Provision Function (DPF), Direct Discovery Name Management Function, and EPC-level Discovery Function. The DPF is used to provision the UE with the necessary parameters to use ProSe Direct Discovery and ProSe Direct Communication.

The term "UE" used in said connection refers to a ProSe-enabled UE supporting ProSe functionality, such as:
  Exchange of ProSe control information between ProSe-enabled UE and the ProSe Function over PC3 reference point.
  Procedures for open ProSe Direct Discovery of other ProSe-enabled UEs over PC5 reference point.
  Procedures for one-to-many ProSe Direct Communication over PC5 reference point.
  Procedures to act as a ProSe UE-to-Network Relay. The Remote UE communicates with the ProSe UE-to-Network Relay over PC5 reference point. The ProSe UE-to Network Relay uses layer-3 packet forwarding.
  Exchange of control information between ProSe UEs over PC5 reference point, e.g., for UE-to-Network Relay detection and ProSe Direct Discovery.
  Exchange of ProSe control information between another ProSe-enabled UE and the ProSe Function over PC3 reference point. In the ProSe UE-to-Network Relay case the Remote UE will send this control information over PC5 user plane to be relayed over the LTE-Uu interface towards the ProSe Function.
  Configuration of parameters (e.g., including IP addresses, ProSe Layer-2 Group IDs, Group security material, radio resource parameters). These parameters can be pre-configured in the UE, or, if in coverage, provisioned by signaling over the PC3 reference point to the ProSe Function in the network.

The ProSe Application Server supports the Storage of EPC ProSe User IDs, and ProSe Function IDs, and the mapping of Application Layer User IDs and EPC ProSe User IDs. The ProSe Application Server (AS) is an entity outside the scope of 3GPP. The ProSe application in the UE communicates with the ProSe AS via the application-layer reference point PC1. The ProSe AS is connected to the 3GPP network via the PC2 reference point.

Vehicular Communication—V2X Services

A new study item has been set up in the 3GPP to consider the usefulness of new LTE features to the automotive industry—including Proximity Service (ProSE) and LTE-based broadcast services. ProSe functionality is thus considered as offering a good foundation for the V2X services. Connected vehicle technologies aim to tackle some of the biggest challenges in the surface transportation industry, such as safety, mobility, and traffic efficiency.

V2X communication is the passing of information from a vehicle to any entity that may affect the vehicle, and vice versa. This information exchange can be used to improve safety, mobility and environmental applications to include driver assistance vehicle safety, speed adaptation and warning, emergency response, travel information, navigation, traffic operations, commercial fleet planning and payment transactions.

LTE support for V2X services contains 3 types of different use cases which are the following:
  V2V: covering LTE-based communication between vehicles.
  V2P: covering LTE-based communication between a vehicle and a device carried by an individual (e.g., handheld terminal carried by a pedestrian, cyclist, driver or passenger).
  V2I: covering LTE-based communication between a vehicle and a road side unit.

These three types of V2X can use "co-operative awareness" to provide more intelligent services for end-users. This means that transport entities, such as vehicles, roadside infrastructure, and pedestrians, can collect knowledge of their local environment (e.g., information received from other vehicles or sensor equipment in proximity) to process and share that knowledge in order to provide more intelligent services, such as cooperative collision warning or autonomous driving.

With regard to V2V communication, E-UTRAN allows such UEs that are in proximity of each other to exchange V2V-related information using E-UTRA(N) when permission, authorization and proximity criteria are fulfilled. The proximity criteria can be configured by the MNO (Mobile Network Operator). However, UEs supporting V2V Service can exchange such information when served by or not served by E-UTRAN which supports V2X Service.

The UE supporting V2V applications transmits application layer information (e.g., about its location, dynamics, and attributes as part of the V2V Service). The V2V payload must be flexible in order to accommodate different information contents, and the information can be transmitted periodically according to a configuration provided by the MNO.

V2V is predominantly broadcast-based; V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

With regard to V2I communication, the UE supporting V2I applications sends application layer information to the Road Side Unit, which in turn can send application layer information to a group of UEs or a UE supporting V2I applications.

V2N (Vehicle to Network, eNB/CN) is also introduced where one party is a UE and the other party is a serving entity, both supporting V2N applications and communicating with each other via LTE network.

With regard to V2P communication, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P Service can exchange such information even when not served by E-UTRAN which supports V2X Service.

The UE supporting V2P applications transmits application layer information. Such information can be broadcast by a vehicle with UE supporting V2X Service (e.g., warning to pedestrian), and/or by a pedestrian with UE supporting V2X Service (e.g., warning to vehicle).

V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X Service, e.g., RSU, application server, etc.

For this new study item V2X, 3GPP has provided particular terms and definition in TR 21.905, current version 13.0.0, which can be reused for this application.

Road Side Unit (RSU): An entity supporting V2I Service that can transmit to, and receive from a UE using V2I application. An RSU can be implemented in an eNB or a stationary UE.

V2I Service: A type of V2X Service, where one party is a UE and the other party is an RSU both using V2I application.

V2N Service: A type of V2X Service, where one party is a UE and the other party is a serving entity, both using V2N applications and communicating with each other via LTE network entities.

V2P Service: A type of V2X Service, where both parties of the communication are UEs using V2P application.

V2V Service: A type of V2X Service, where both parties of the communication are UEs using V2V application.

V2X Service: A type of communication service that involves a transmitting or receiving UE using V2V application via 3GPP transport. Based on the other party involved in the communication, it can be further divided into V2V Service, V2I Service, V2P Service, and V2N Service.

The 3GPP has also agreed on some potential requirements for V2X communication, where some of the relevant ones will be presented in the following.

[CPR-011] The E-UTRA(N) shall be able to support a maximum frequency of 10 V2X messages per second per V2X entity (e.g., UE and RSU).

[CPR-015] For particular usage (i.e., pre-crash sensing) only, the E-UTRA(N) should be capable of transferring V2X messages between two UEs supporting V2V Service with a maximum latency of 20 ms.

[CPR-018] The 3GPP network should make available any supported positional accuracy improvement techniques (e.g., DGPS and/or OTDOA) in a resource efficient way to a subscribed UE supporting V2X Service.

[CPR-026] The 3GPP system shall be able to vary the transmission rate and coverage area based on service conditions (e.g., UE speed, UE density).

[CPR-030] The E-UTRAN shall be capable of transferring V2X messages between UEs supporting V2V Service with a maximum relative velocity of 280 km/h.

Vehicular communication will presumably be based on ProSe direct communication. However, the usual Rel. 12 D2D resource allocation might not be sufficient for the new V2X usage scenarios. In particular, as explained before, randomization is a basic principle used in D2D communication; specifically, for Mode 2 where the UE(s) autonomously and randomly select radio resources for communication from configured radio resource pools. In D2D-based vehicular communication, time-and-frequency resource collision can become a more serious problem, e.g., because the packet size may increase (due to vehicular applications possibly transmitting often and large amounts of data) and there is a large number of UEs in the target coverage particularly for dense UE-deployment scenarios such as in urban scenarios.

Correspondingly, the currently envisaged resource allocation for vehicular communication based on D2D might not be optimal and will require various adaptations to the new usage scenarios.

BRIEF SUMMARY

Non-limiting and exemplary embodiments provide an improved resource allocation method for vehicular communication for a vehicular mobile terminal.

The independent claims provide non-limiting and exemplary embodiments. Advantageous embodiments are subject to the dependent claims.

According to several aspects described herein, the determination of radio resources to be used by a vehicular mobile terminal for communicating with another mobile terminal (be it vehicular mobile terminal or normal mobile terminal) shall be improved.

In order to discuss these aspects, the following exemplary assumptions are made. A vehicular mobile terminal is assumed which has been set up appropriately for performing direct communications with other mobile terminals, i.e., via corresponding sidelink connection(s). It is further assumed that the vehicular mobile terminal wants to communicate with other mobile terminal(s) and thus needs to determine particular sidelink radio resources to be used in said respect.

According to a first aspect, the determination of these radio resources is improved. In particular, the first aspect distinguishes between two different radio resource determinations, one where the location of the vehicular mobile terminal is considered and the other one where the location of the vehicular mobile terminal is not considered. As known from the background section, the usual sidelink resource allocation (e.g., Mode 1 and Mode 2) does not consider the location of the (vehicular) mobile terminal, e.g., the mobile terminal autonomously selects radio resources from a radio resource pool (i.e., Mode 2) and the radio base station decides on the radio resources without reference to the location of the mobile terminal.

On the other hand, according to the first aspect, the resource allocation for vehicular communication shall be improved by taking the location of the vehicular mobile terminal into account. This can for instance be implemented such that radio resources that would be normally available to the vehicular mobile terminal would be "restricted" based on the location of the vehicular mobile terminal.

Exemplarily assuming the UE-autonomous resource selection (Mode 2), different radio resource pools could be defined for different possible positions of a vehicle, such that the vehicular mobile terminal will select radio resources from that radio resource pool that is associated with the particular location of the vehicular mobile terminal. The vehicular mobile terminal is configured with these different radio resource pools such that it can autonomously select among the various radio resource pools based on its determined location. There are several ways on how the vehicular mobile terminal can be configured with these different radio resource pools. According to one way, explicit information on the radio resource pools (such as the radio resources and the association with the possible locations of the vehicular mobile terminals) could be provided to the vehicular mobile terminal, e.g., within the system information broadcast by the radio base station in its cell or within a message which is dedicated to the vehicular mobile terminal. In another implementation, the different radio resource pools may not be explicitly notified to the vehicular mobile terminal, but may be determined by the vehicular mobile terminal itself based on general information on available radio resources and on a set of rules allowing the vehicular mobile terminal to assign on its own the available radio resources to the respective possible locations of vehicular mobile terminals thereby defining the different radio resource pools from which the vehicular mobile terminal can then select the necessary radio resources.

On the other hand, when exemplarily assuming the eNB-scheduled resource allocation (i.e., Mode 1), then the vehicular mobile terminal will determine its location and provide information thereon in one form or another to the radio base station, which in turn can then select appropriate radio resources (for example, but not necessarily, from a radio resource pool) based on the received location information of the vehicular mobile terminal. For instance, the radio base station could select the radio resources such that other (vehicular) mobile terminals in the vicinity will not experience interference from the vehicular mobile terminal communication. Correspondingly, the radio base station would then inform the vehicular mobile terminal on the decided radio resources, such that the vehicular mobile terminal may use them for communication with other mobile terminal(s).

In general, the location-assisted resource allocation shall assist in allocating radio resources that are orthogonal to each other, so as to reduce or completely avoid interference between nearby vehicular mobile terminals when they communicate at the same time.

However, this improved resource allocation may not be optimal in all situations and thus shall be used selectively according to the first aspect. In more detail, some entity in the communication system (e.g., the eNB, or a ProSe-related entity, or an MME) may have control over whether the improved location-assisted resource allocation is to be used or the usual resource allocation without considering the location of the vehicular mobile terminal. This entity may take the decision based on various different parameters, such as the number of vehicles in the respective area, the speed of the vehicles, the cell topology of the respective area (e.g., highway or city center or rural, etc.) and possibly other information. For instance, in case of a dense, and slow-moving, traffic situation, the entity may decide to not assist the resource allocation with the vehicle location. For example, it may be difficult to distinguish the various locations of nearby vehicular mobile terminals, such that assistant the resource allocation with vehicle locations might not be helpful. On the other hand, in case of free-flowing, possibly middle or high-speed traffic, the entity may decide that it is advantageous to also consider the vehicle location when determining the radio resources for communication with other mobile terminals. On the other hand, it may also be possible to decide the other way rounds, considering that in a dense traffic situation, the high vehicle density (more UEs in the same location area than in freeways) pushes up the demand for resources Furthermore, whether to use the location-assisted resource allocation or without location-assistance may also depend on the time, for instance peak hours where the traffic is usually dense while at other times the traffic situation is different.

Moreover, a vehicular mobile terminal shall somehow be able to determine which resource allocation (i.e., location-assisted or without considering its location) it is supposed to use at a particular point in time. Consequently, corresponding information must be provided to the vehicular mobile terminal, which may be done in various different forms, two examples of which will be briefly discussed below. According to one possible implementation, the vehicular mobile terminal is provided with explicit information on the result of the decision, e.g., by a flag broadcast by the radio base station in its system information instructing the vehicular mobile terminal to use the vehicle location or not. Another possible implementation allows the vehicular mobile terminal to deduce whether to consider its location from configured parameters in the vehicular mobile terminal, e.g., from parameters that are related to this improved location-assisted resource allocation and are used by the vehicular mobile terminal when determining its location or when determining the radio resources.

So far, the first aspect was described in general terms regarding the location of the vehicular mobile terminal. However, there are different ways on how the location of the vehicular mobile terminal can be determined and presented. One possible way is to use the geographical coordinates, such as longitude and latitude, e.g., commonly known from GPS. According to an improvement of the first aspect, the location of a vehicle mobile terminal is determined as a section and/or subsection of a road on which the vehicular mobile terminal is currently traveling on. So, in this sense each road has a corresponding identification, e.g., a road or street name and/or number and a corresponding start and end location. Also, it is assumed that information on maps is available to the vehicular UE, which may also contain information on the edges of the particular road. In particular, roads are divided in sections and/or subsections thus allowing the location of the vehicular mobile terminal to actually be simply represented by an identification of the section and/or subsection of the road instead of using geographical coordinates. Correspondingly, the vehicular mobile terminal will determine its location as a section of the road (which might still require the vehicular mobile terminal to first determine the geographical coordinates and then to "translate" these geographical coordinates into the possible section/subsection of the road in which it is located). This would also be advantageous in those cases where the information of the determine position of the vehicular mobile terminal is to be transmitted to the radio base station (e.g., for Mode 1 resource allocation, where the radio base station decides on the radio resources), since the amount of information that needs to be transmitted can be thus reduced.

An exemplary division of the road is based on a grid overlaying a road, the grid thus defining sections, which in turn are further subdivided into subsections. For example, each section may cover all lanes of the road and may span a particular length of the road. This section is then divided into a plurality of subsections, where, e.g., one subsection may only cover one or more, but not all, lanes of the road. The subsections may span the same length of the road as the section, or may span only a fraction of the section while the rest of the length of the section is "covered" by other subsection(s). Furthermore, within a particular area with same or similar characteristics, each section shall be set up (i.e., divided) into the same plurality of subsections, such that the grid is repeated from section to section along the road.

This division of a road in sections and subsections may repeat for every section the same association between a location within the section (i.e., a subsection as a possible location of a vehicle) and particular radio resources available to vehicular mobile terminals located in that subsection. Within each section, the distribution of the available radio resources between the plurality of subsections of the section is such that interference shall be mitigated or avoided. For instance, the various radio resources associated to the subsections within a section shall be orthogonal to each other. Furthermore, since the sections, and thus the subsections and their associated (orthogonal) radio resources, repeat themselves, the interference caused by vehicular mobile terminals communicating in neighboring sections should be mitigated or avoided as well.

According to a further improvement of the first aspect, the resource allocation is further improved by implementing a sensing capability in the vehicular mobile terminal, so as to determine whether potential radio resources are or will be used by another mobile terminal, in which case these potential radio resources would be blocked and should not be used if possible. In particular, exemplarily assuming the UE-autonomous radio resource selection (Mode 2), the vehicular mobile terminal, before actually selecting radio resources from a radio resource pool which is associated with its location, will determine whether these potential radio resources (i.e., in the process of being selected by the vehicular mobile terminal) are actually already in use by another mobile terminal. For instance, the vehicular mobile terminal will be able to determine this by, e.g., using RSSI (Received Signal Strength Indication) measurements wherein it measures the total received signal strength (which is a measure of the energy transmitted) on the corresponding Resource Elements (REs) of a candidate (time-frequency) resources, e.g., PRB pair. When the RSSI is greater than a certain threshold, it deduces that said resources are occupied. It may in addition statistically deduce that the said resources will remain "busy" for a certain time (e.g., number of TTIs). This statistical deduction can be based on the UE implementation of the past "busy-ness" of the resources in the same or neighboring pool or can be signaled by the network, e.g., in the RRC signaling (Broadcast or Dedicated). For instance, a "busy-ness" of 2 would mean that on average, the resources remain "busy", after the observation instance, for 2 control/data cycles.

According to an alternative or additional method, individual candidate SA messages (PSCCH) would be received and decoded and the vehicular mobile terminal can check if these indicate any future "busy-ness" in coming control/Data cycles. If an individual candidate SA is not being transmitted currently, the vehicular UE could assume the control (SA) and the corresponding Data resources as "free".

The "busy-ness" in SA message may also indicate a corresponding period of busy-ness during which it intends to keep transmitting on the corresponding control/Data resources. In the simplest form it will be a Boolean value indicating "busy-ness" period as 1 cycle or some other 'fixed' number of Cycles.

Then, in such a case where the potentially to be selected radio resources are being blocked by another mobile terminal, the vehicular mobile terminal shall select different radio resources.

Furthermore, in case no other resources can be selected from the radio resource pool associated with the location of the vehicular mobile terminal (e.g., due to blocking as just explained), the vehicular mobile terminal shall be able to select radio resources from another radio resource pool, i.e., a radio resource pool associated with a location which is not the location of the vehicular mobile terminal. For example, this other radio resource pool can be associated with a location which is right next to the actual location of the vehicular mobile terminal; alternatively, the other radio resource pool can be associated with a location which is further or even furthest away from the actual location of the vehicular mobile terminal. Alternatively, or in addition, different relative priorities can be given to the various subsections and the associated radio resources based on the distance of the subsection from the subsection in which the vehicular mobile terminal is located. For instance, the priority decreases with increasing distance, such that a vehicular mobile terminal shall select radio resources from another radio resource pool associated with a subsection having the highest (remaining) priority (i.e., a subsection right next to the subsection in which the mobile terminal is located).

This additional improvement where a vehicular mobile terminal performs a sensing of the potential radio resources prior to actually using them is especially advantageous in scenarios where such radio resource collisions are likely to happen. For instance, it was discussed before that a road can be divided into sections and/or subsections, each subsection being associated with a particular set of resources (e.g., a resource pool) from which the vehicular mobile terminal (located in the associated position) can select suitable radio resources. Depending on how the sections and/or subsections are actually set up, a subsection may cover an area in which only one, or more than one, vehicular mobile terminals can be located at the same time and may thus use the same associated radio resources. The sensing as explained above for the improved implementation of the first aspect can avoid such radio resource collisions by first determining whether radio resources are already blocked before actually using these radio resources for communication with another mobile terminal.

According to a second aspect, which is different from the above discussed first aspect, the determination of the radio resources by a vehicular mobile terminal is improved as well. Also the second aspect distinguishes between two different radio resource determinations, in this case however, one radio resource allocation comprises the additional process of sensing whether radio resources are or will be in use by another mobile terminal, while the other radio resource allocation does not involve the additional sensing procedure.

Sensing has been already discussed above as a further improvement to the location-assisted radio resource determination of the first aspect, but is considered as a stand-alone improvement according to the second aspect. As explained before, sensing shall be understood as a capability of the vehicular mobile terminal to determine whether potential radio resources are or will be used by another mobile terminal. In case these potential radio resources would be blocked by another (vehicular) mobile terminal, the vehicular mobile terminal may decide to not use them so as to avoid a collision, and rather proceed to determine different radio resources.

Sensing may involve at least two different ways on how to determine whether radio resources are blocked or not. According to a first way, the received signal strength on corresponding radio resources (e.g., resource elements of a candidate PRB pair) is measured by the vehicular mobile terminal and compared to a threshold, so as to finally consider that the radio resource is blocked in case that the received signal strength is larger than the threshold. Therefore, the vehicular mobile terminal is able to determine whether at this particular moment potential radio resources are being used by another mobile terminal or not.

In addition or as an alternative, the vehicular mobile terminal may monitor SA (Scheduling assignment) messages transmitted by other mobile terminals as part of the D2D transmission procedure. The SA messages will indicate the particular radio resources that will be used to transmit the associated data message (in the same or a later subframe). Consequently, the vehicular mobile terminal will thus be able to learn from the SA messages which radio resources will be likely used in the future by these mobile terminals, and thus be blocked from use.

Sensing can be performed by the vehicular mobile terminal when determining radio resources according to Mode 1 (eNB-scheduled) or Mode 2 (UE-autonomous). In particular, assuming the UE-autonomous resource allocation of Mode 2, the vehicular mobile terminal shall perform sensing before actually using radio resources from a suitable radio resource pool. For instance, the vehicular mobile terminal might first select a potential set of resources from the radio resource pool, and may then sense whether these selected resources are blocked by another mobile terminal or not, and then repeat this procedure until the vehicular mobile terminal finds radio resources in the radio resource pool that are free, i.e., not blocked by another mobile terminal. On the other hand, before even selecting a potential set of resources, the vehicular mobile terminal may perform the sensing on all possible radio resources of the radio resource pool, and will then disregard those radio resources from the radio resource pool that are blocked. Subsequently, the vehicular mobile terminal may select radio resources among those free radio resources remaining in the radio resource pool.

As a further improvement to the second aspect, the radio resource allocation can be improved by additionally considering the location of the vehicular mobile terminal as explained in detail for the first aspect. In order to avoid repetition, reference is made to the above passages of the first aspect discussing how the vehicular mobile terminal determines its location and considers same when determining the radio resources, how the location of the vehicular mobile terminal can be used in Mode 1 as well as Mode 2 radio resource allocation, how the location can be geographical coordinates or identifiers indicating sections and/or subsections into which a road is divided, etc.

Correspondingly, in one general first aspect, the techniques disclosed here feature a vehicular mobile terminal for determining radio resources for communicating with at least a second mobile terminal in a communication system. A processor of the vehicular mobile terminal determines whether to determine radio resources based on the location of the vehicular mobile terminal or not, wherein the determination is based on information received from an entity of the communication system. In case the radio resources are to be selected based on the location of the vehicular mobile terminal, the processor determines the location of the vehicular mobile terminal, and determines radio resources for communication with at least the second mobile terminal, based on the determined location of the vehicular mobile terminal.

Correspondingly, in one general first aspect, the techniques disclosed here feature a radio base station in a communication system for assisting a vehicular mobile terminal in determining radio resources for communicating with at least a second mobile terminal in the communication system. A processor of the radio base station determines whether radio resources are to be determined based on the location of the vehicular mobile terminal or not. The determination is at least based on information on vehicular mobile terminals in the cell of the radio base station. A transmitter of the radio base station transmits information to the vehicular mobile terminal, based on which the vehicular mobile terminal determines whether to determine radio resources based on the location of the vehicular mobile terminal or not.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF THE SEVERAL VIEWS OF THE DRAWINGS

In the following exemplary embodiments are described in more detail with reference to the attached figures and drawings.

DETAILED DESCRIPTION

Figure 1:
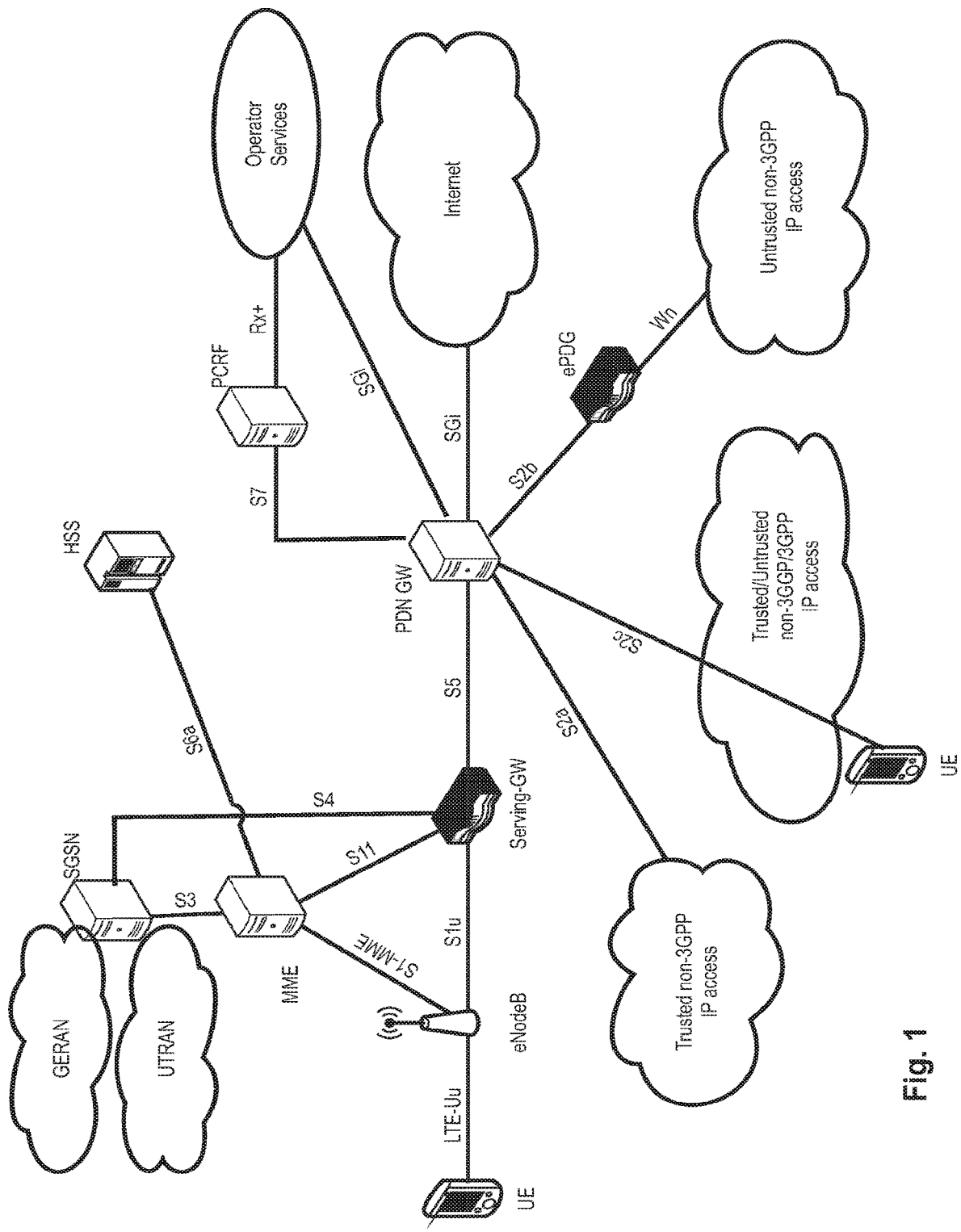
FIG. 1 shows an exemplary architecture of a 3GPP LTE system.
Figure 2:
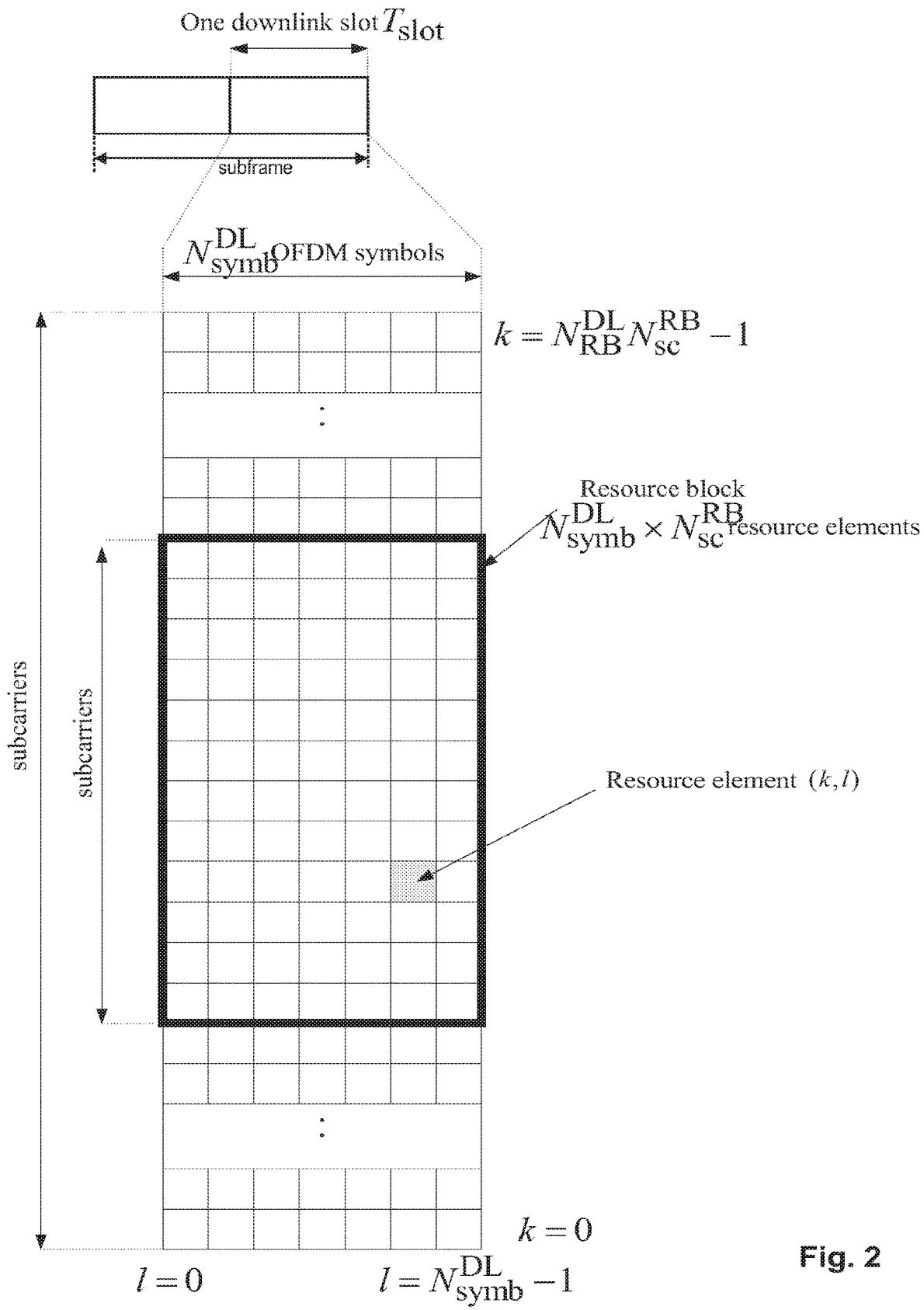
FIG. 2 shows an exemplary downlink resource grid of a downlink slot of a subframe as defined for 3GPP LTE (Release 8/9), FIG. 3 schematically illustrates how to establish a layer-2 link over the PC5 for ProSe communication.
Figure 3:
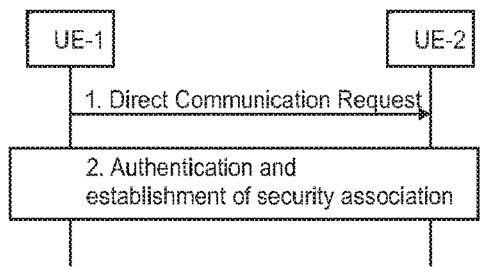
Figure 4:
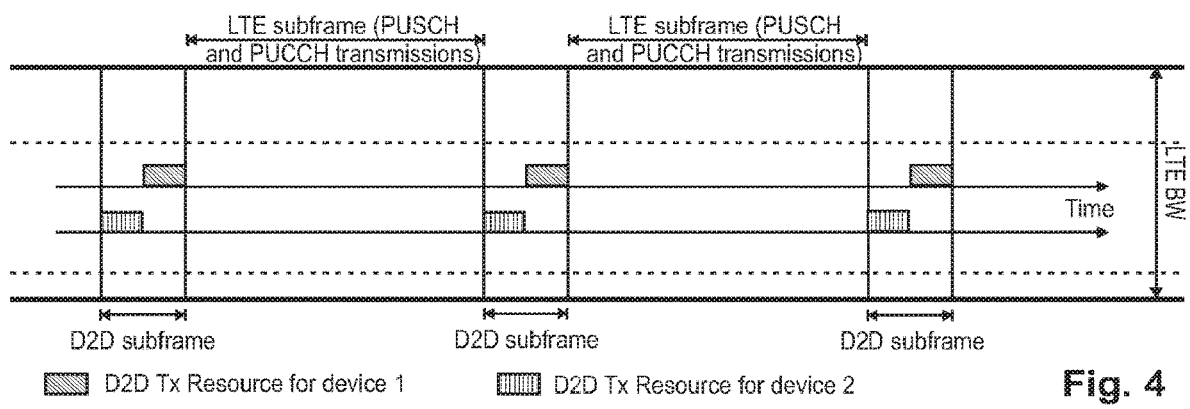
FIG. 4 illustrates the use of transmission/reception resources for overlay (LTE) and underlay (D2D) systems.
Figure 5:
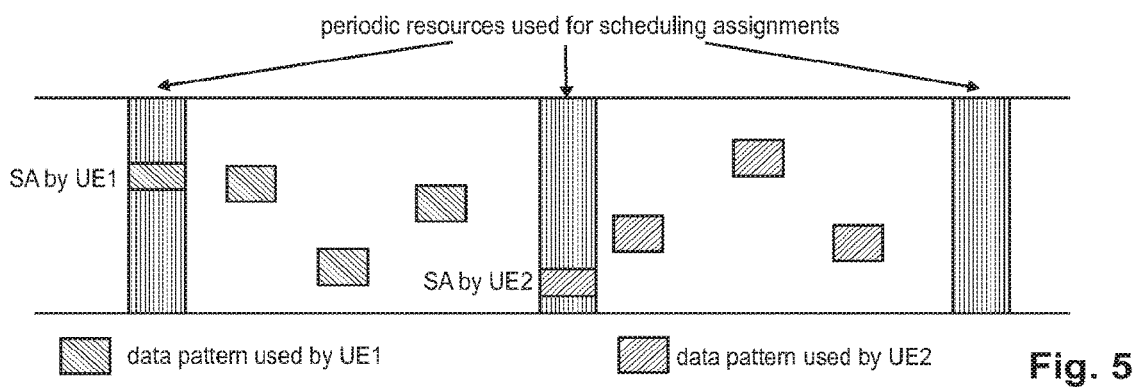
FIG. 5 illustrates the transmission of the Scheduling Assignment and the D2D data for two UEs.
Figure 6:
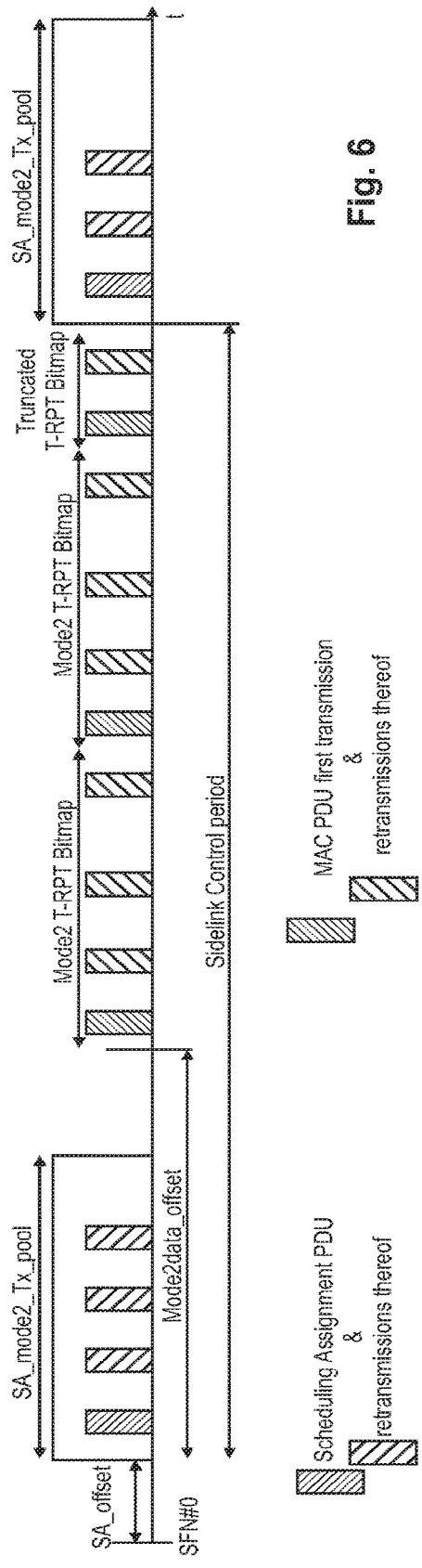
FIG. 6 illustrates the D2D communication timing for the UE-autonomous scheduling Mode 2.
Figure 7:
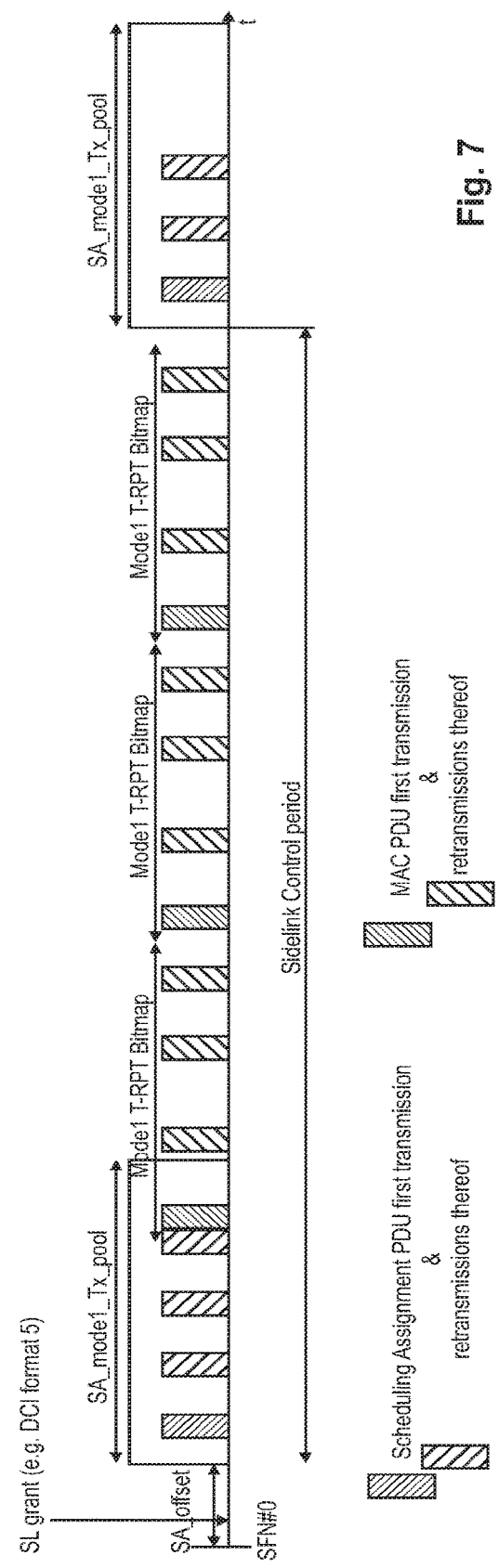
FIG. 7 illustrates the D2D communication timing for the eNB-scheduled scheduling Mode 1.
Figure 8:
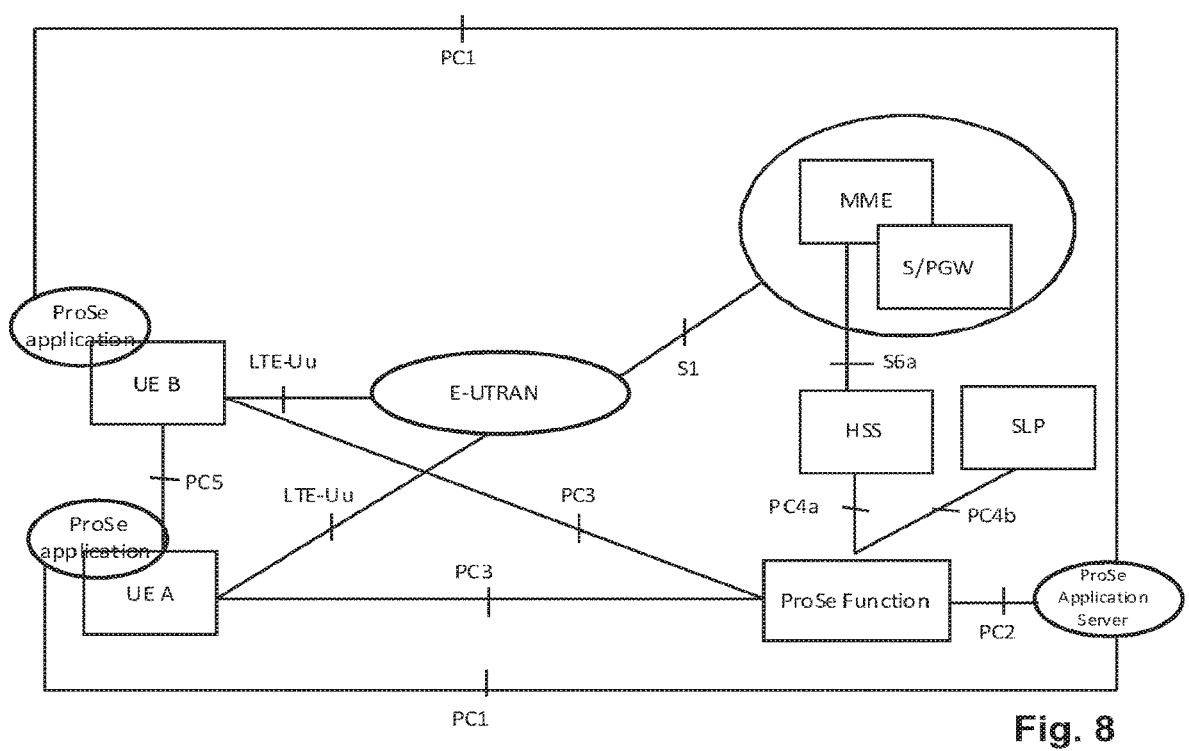
FIG. 8 illustrates an exemplary architecture model for ProSe for a non-roaming scenario, FIG. 9A, B, C exemplarily illustrate different divisions of a road into subsections and sections according to the embodiments.

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

The term "direct communication transmission" as used in the application is to be broadly understood as a transmission directly between two user equipments, i.e., not via the radio base station (e.g., eNB). Correspondingly, the direct communication transmission is performed over a "direct sidelink connection", which is the term used for a connection established directly between two user equipments. For example, in 3GPP the terminology of D2D (Device-to-Device) communication is used or ProSe communication, or a sidelink communication. The term "direct sidelink connection" is to be broadly understood and can be understood in the 3GPP context as the PC5 interface described in the background section.

The term "ProSe" or in its unabbreviated form, "Proximity Services", used in the application is applied in the context of Proximity-based applications and services in the LTE system as exemplarily explained in the background section. Other terminology such as "D2D" is also used in this context to refer to the Device-to-Device communication for the Proximity Services.

The term "vehicular mobile terminal" as used throughout the application is to be understood in the context of the new 3GPP study item V2X (vehicular communication) as explained in the background section. Correspondingly, a vehicular mobile terminal shall be broadly understood as a mobile terminal which is specifically installed in a vehicle (e.g., car, commercial trucks, motorcycles etc.) to perform vehicular communication, i.e., passing information related to the vehicle to other entities (such as vehicles, infrastructure, pedestrians), e.g., for the purpose of safety or driver assistance. Optionally, the vehicular mobile terminal may have access to information available at the navigation system (provided it is also installed in the car), such as map information, etc.

The term "road" as used throughout the application is to be broadly understood as covering any piece of land on which a vehicle can be driven, including highways, motorways, paths, routes, streets, avenues.

As explained in the background section, 3GPP has introduced a new study item for LTE-assisted vehicular communication, which shall be based on ProSe procedures including the resource allocation according to Mode 1 and Mode 2. However, the resource allocation based on ProSe may not be sufficient to fulfill all the requirements for V2X communication and might thus need to be adapted.

The following exemplary embodiments are conceived by the inventors to mitigate one or more of the problems explained above.

Particular implementations of the various embodiments are to be implemented in the wide specification as given by the 3GPP standards and explained partly in the background section, with the particular key features being added as explained in the following pertaining to the various embodiments. It should be noted that the embodiments may be advantageously used for example in a mobile communication system, such as 3GPP LTE-A (Release 10/11/12/13) communication systems as described in the Technical Background section above (or later releases), but the embodiments are not limited to its use in this particular exemplary communication networks.

The explanations should not be understood as limiting the scope of the disclosure, but as a mere example of embodiments to better understand the present disclosure. A skilled person should be aware that the general principles of the present disclosure as laid out in the claims can be applied to different scenarios and in ways that are not explicitly described herein. For illustration purposes, several assumptions are made which however shall not restrict the scope of the following embodiments.

Furthermore, as mentioned above, the following embodiments may be implemented in the 3GPP LTE-A (Rel.12/13) environment, but possibly also in future releases. The various embodiments mainly provide an improved resource allocation for vehicular mobile terminals. Therefore, other functionality (i.e., functionality not changed by the various embodiments) may remain exactly the same as explained in the background section or may be changed without any consequences to the various embodiments. This includes, e.g., other procedures relating to the actual use of the determined (sidelink) radio resources i.e., after the radio resources have been selected, and the vehicular UE uses them to perform the transmission of data (possibly including the transmission of the scheduling assignment too).

First Embodiment

In the following a first embodiment for solving the above-mentioned problem(s) will be described in detail. Different implementations and variants of the first embodiment will be explained as well.

Exemplarily, a vehicular UE is assumed which is installed in a vehicle and is capable of performing vehicular communication based on the D2D framework as explained in the background section of this application. It is further assumed that the vehicular UE shall communicate with other UEs and thus needs to first determine suitable sidelink radio resources to be used for said purpose. The first embodiment focuses on how the sidelink radio resources can be efficiently determined by the vehicular UE so as to then be able to communicate with other (vehicular) UEs in a usual manner using these determined radio resources.

The radio resource allocation according to the first embodiment is based on the radio resource allocation as already defined for D2D communication, thus generally distinguishing between Mode 1 and Mode 2 resource allocations as explained in detail in the background section. Independently from the Mode 1 and Mode 2 resource allocations however, the first embodiment additionally distinguishes between two different radio resource allocations, which differ from one another as will be explained in the following. One of the two radio resource allocations shall be the common radio resource allocation as explained in detail in the background section for D2D communication; as apparent therefrom, the location of the (vehicular) UE has no influence on which radio resources are determined in the Mode 1 or Mode 2 resource allocation procedure. On the other hand, the second radio resource allocation according to the first embodiment is based on the radio resource allocation for D2D communication too but additionally considers the location of the vehicular UE when determining the radio resources as will be explained in more detail below.

The vehicular UE shall determine the radio resources according to one of the two above-mentioned radio resource methods and thus must be informed/instructed which resource allocation it shall use. This step of informing the vehicular UE on which method of resource allocation to use may be performed by a suitable entity in the mobile communication system such as the eNodeB, an MME or a ProSe-related entity in the core network. This entity may also be responsible for deciding which resource allocation method to use and also responsible for letting the UE know which resource allocation method it shall use. For ease of explanation, in the following it is exemplarily assumed that it is the eNodeB which is the entity responsible for taking the decision and informing the vehicular UEs.

Assuming that the vehicular UE is to use the improved resource allocation method introduced by this first embodiment, the vehicular UE shall determine its location and then determine radio resources on the basis of the just determined location of the vehicular UE.

On the other hand, assuming that the vehicular UE is not to use the improved location-assisted resource allocation method but the usual resource allocation method as explained before for D2D, then it is not necessary for the vehicular UE to determine its location for the radio resource determination. Rather, the vehicular UE will determine suitable radio resources for communication with another UE according to Mode 1 or Mode 2 in the usual manner.

As broadly presented above, the improved location-assisted resource allocation method introduced with this first embodiment shall be selectively used under control of an entity in the mobile communication system such as the eNodeB. Correspondingly, the resource allocation that also considers the vehicle location is not applied in all situations but could only be applied when providing substantial benefits.

In general, it should be noted that additionally considering the location of vehicular UEs in the resource allocation process can have the following benefits. Using location as a basis for resource allocation allows the network to dedicate different amount of resources for V2X communication based on traffic statistics, e.g., higher resources for V2X communication in more traffic-dense location and lower resources for V2X communication in sparse traffic areas. Furthermore, for special implementations of the first embodiment to be discussed later, location and having corresponding resources requires the vehicular UE to sense only a limited portion of the available resource pool. For example, if there are up to 32 resource pools configured and only couple of them belongs to the vehicular UE's location, then it only needs to perform sensing in these two resource pools. This not only saves time but also battery.

On the other hand, determining the location of the vehicular UE, and also possibly transmitting information thereon to the eNB for radio resource allocation has the disadvantage of requiring the vehicular UEs to repeatedly track its location and of spending radio resources for informing the eNB on this location so as to assist in the resource allocation. The benefits and disadvantages provided by the location-assisted resource allocation need to be balanced. Consequently, the first embodiment selectively uses the improved location-assisted resource allocation method for particular situations but not for others.

Figure 10:
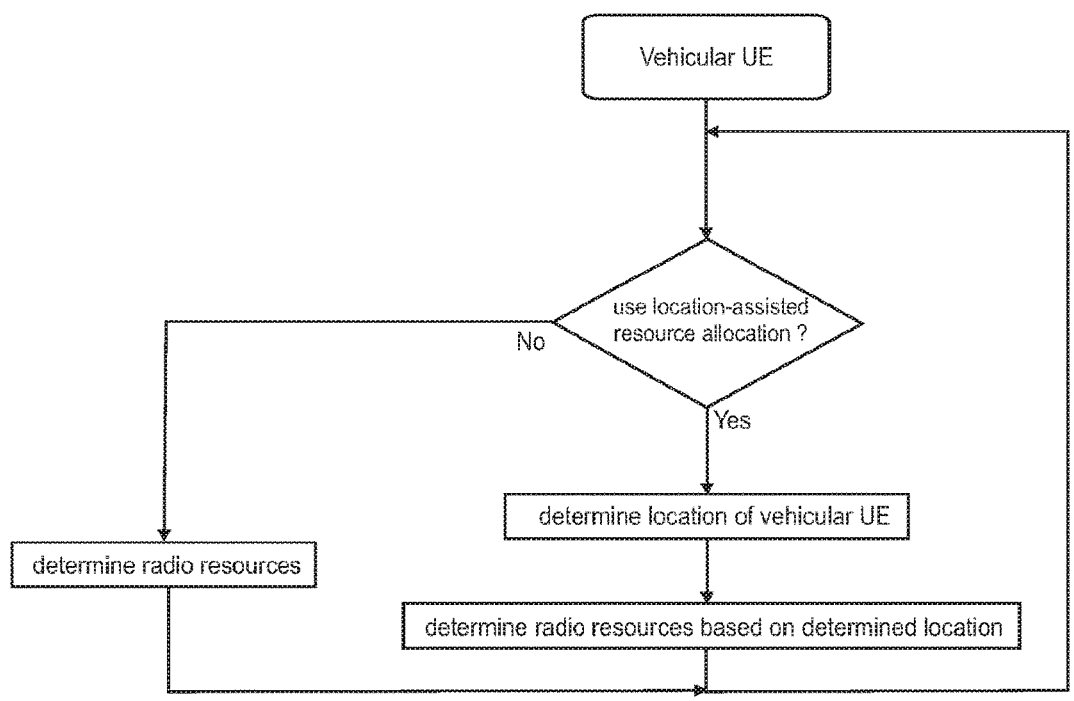
FIG. 10 illustrates exemplarily a sequence diagram for an operation of the vehicular UE according to the first embodiment.

FIG. 10 is a sequence diagram for a vehicular UE exemplarily illustrates the operation of the vehicular UE as explained above for the first embodiment.

In the following more specific implementations of the first embodiment will be explained which may provide further advantages.

The above broad explanation of the first embodiment involves an entity (e.g., the eNB) which selectively decides as to whether to use one resource allocation method or the other; i.e., to additionally consider the vehicular UE location or not. As explained above, additionally considering the vehicle location for the resource allocation can provide benefits especially in particular scenarios. Correspondingly, the eNB can base its decision on suitable information that allows to distinguish between these different situations. This information may for instance include at least one of the following: information on the number of vehicles in a particular area, the speed and/or direction of the vehicles, the traffic situation in the particular area (e.g., whether there is dense traffic or free-flowing traffic, traffic jam), the cell topology of the particular area (e.g., highway, city center, or rural), the time of day since traffic situations may change during the day. For particular implementations of the first embodiment, other information which may be important for this decision may include information on how the road is divided into sections and/or subsections as will be explained in detail later. Correspondingly, the eNB may also consider the particular division of the road into subsections and sections when making the decision as to whether particular vehicular UEs shall use or not its vehicle location when determining the radio resources.

The following two examples are provided in order to understand how such a decision can be performed. For instance, a dense and slow moving traffic situation is assumed where vehicles are located side-by-side such that it may be difficult to distinguish between the various locations of these nearby vehicular UEs. In said case, the benefit that can be gained from additionally using the location information for the resource allocation may become minimal, and thus the eNB may decide that the vehicular UEs in a particular area shall not use the improved location-assisted resource allocation method but to use the usual D2D resource allocation.

In another example, a free-flowing traffic situation is assumed where the vehicles may travel at mid or high speed and where it is easily possible to distinguish the location of the various vehicles due to the distance which is being kept in between by the vehicle drivers. Correspondingly, in such a situation it may be beneficial to assist the radio resource allocation by also considering the location of the various vehicles.

Consequently, the eNB will take such a decision in either way and shall then ensure that the vehicular UE(s) are instructed to perform the resource allocation in accordance therewith.

Many ways can be envisaged on how the vehicular UE is provided with suitable information on whether to use one resource allocation method or the other. This also depends on the cell area controlled by the eNodeB. In particular, cell areas can be small or large and may thus also be different in that they cover a particular homogenous area with similar traffic situations where the eNodeB will reach the same decision as to whether to use the location-assisted resource allocation or not. In said case, all vehicular UEs reachable by the eNodeB in its cell will be configured in the same manner to use or not use the location-assisted resource allocation and in general the eNodeB could provide the corresponding information in a broadcast in its cell.

On the other hand, the cell of an eNodeB may cover several different roads with different characteristics leading the eNodeB to distinguish between different areas of its cell as regards to whether to use the location-assisted resource allocation or not. Correspondingly, only some of the vehicular UEs reachable by the eNodeB in its cell will be configured in the same manner while others will be configured differently. In this case, a cell broadcast may not be applicable but the different vehicular UEs could be configured/informed by dedicated messages.

According to one possible implementation of the first embodiment, the vehicular UE is explicitly instructed to perform either of the two resource allocation methods, which can be done by a corresponding flag which in turn may be transmitted either in system information broadcast by the eNodeB in its cell or in a corresponding dedicated message addressed to particular vehicular UE(s) as just explained. The flag can be one bit long where each of the two bit values unambiguously instructs the vehicular UE to use either one of the two resource allocation methods distinguished in the first embodiment.

Alternatively, or in addition, instead of providing an explicit instruction to the vehicular UE, a second implementation of the first embodiment is based on that the vehicular UE will deduce whether to use the improved location-assisted resource allocation method or not from its internal configuration. In particular, in order to apply the location-assisted resource allocation method, the vehicular UE(s) will usually be configured with additional parameters that are related to this improved location-assisted resource allocation. For instance, as will be explained in detail below, the location of the vehicular UE can be determined on the basis of sections and/or subsections into which a road is divided. In that case, in order for the vehicular UE to be able to identify the particular sections and/or subsections, it may be provided with suitable information on the sections and/or subsections of roads. Therefore, if the vehicular UE is configured with such parameters for use in determination of the location, it will determine that it shall also make use of these parameters and thus shall use the location-assisted resource allocation method. Conversely, if the vehicular UE notices that no such parameters have been configured so far, it will determine that the improved location-assisted resource allocation method shall not be used; actually, the vehicular UE would not be able to determine the location as a function of the sections/subsections due to the missing parameters. This is however only an example, and also other parameters may be configured in the vehicular mobile terminal in connection with the two resource allocation methods. For instance, in case the normal D2D resource allocation method shall be used, an implementation of the first embodiment provides a particular, larger, radio resource pool specifically for the vehicular communication. In that case, if the vehicular UE determines that such a larger radio resource pool is configured, it will deduce to use the normal D2D resource allocation method instead of the location-assisted resource allocation method. These radio resource pools may be signaled as in the legacy, e.g., common resource pool in SIB19 or sending the dedicated resource pool using RRC dedicated message to the RRC Connected UEs.

In any case, according to the various implementations of the first embodiment, each of the vehicular UEs will know at any time whether to use one resource allocation method or the other.

The above broad explanation of the first embodiment generally explained that the vehicular UE will determine the radio resources based on its location, without going into detail as to how the radio resources are actually determined.

As explained before, both radio resource allocation methods distinguished by the first embodiment may exemplarily be based on the common D2D resource allocation as explained in detail in the background section. Correspondingly, according to implementations of the first embodiment, Mode 1 and Mode 2 resource allocations are differentiated as well, respectively being extended so as to consider the vehicular UE location as well.

According to the Mode 1 resource allocation, the eNB controls which radio resources shall be used in its cell by the (vehicular) UEs. Correspondingly, the vehicular UEs, when radio resources need to be determined, will request the eNodeB (that controls the radio cell in which the vehicular UE is located) for such radio resources. In detail, this may be done by the vehicular UE transmitting a scheduling request followed by a buffer status report to the eNodeB, as explained exemplarily in the background section for the current 3GPP release for D2D communication.

The eNodeB learns that this particular vehicular UE has data to transmit, based on the received scheduling request and buffer status report and can then decide on the particular radio resources to be scheduled for this vehicular UE so as to allow it to communicate with other UEs. According to the improved location-assisted resource allocation method of the first embodiment, the eNodeB will additionally receive location information from the vehicular UE (e.g., together with the buffers status report and the scheduling request) and will also take into account this vehicular location information when determining the radio resources. In particular, the eNodeB will be aware of the location of various vehicular UEs and normal UEs in its area and can thus make use of its knowledge of topology, vehicle density, traffic demands, out of band emissions, interference situation, etc., to schedule resources to nearby vehicular UEs such that interference between them is mitigated.

A corresponding response from the NodeB to the vehicular UE will then include a suitable indication of the radio resources the vehicular UE shall use for communication with other mobile terminal(s). The vehicular UE will receive the corresponding response from the eNodeB and can then perform the vehicular communication, e.g., comprising the transmission, in the usual manner, of the scheduling assignment message and of the data on the radio resources as scheduled by the eNodeB.

For the Mode 1 resource allocation method as just described, it is assumed that the eNodeB is provided with the vehicular UE location. This may be done in various manners and also depends on the actual content of the vehicular UE location that is transmitted to the eNodeB. As will be explained later in more detail, the vehicular UE location may be generally presented as geographical coordinates (e.g., GPS) or as a section/subsection into which roads can be divided. Correspondingly, there is also a difference as to the amount of data that is transmitted, where the geographical coordinates need more data and the IDs of a section/subsection presumably will need less data. In any case, the vehicular UE location may be transmitted to the eNodeB together with the scheduling request and the buffer status report. The information on the vehicular UE location may be carried separately from the scheduling request and the buffer status report, or the scheduling request might be extended with a field carrying said information on the vehicular UE location. Another possible way to do it will be to use the RRC SidelinkUEInformation message including the latest location each time the location information changes substantially like, e.g., every 100 ms. or so.

Correspondingly, the vehicular UE will be able to determine radio resources according to Mode 1 additionally based on its own location. This Mode 1 request will include SidelinkUEInformation message including details of size and periodicity of required V2X/V2V message transmission and subsequently the BSR reports indicating any changes in the Buffer Occupancy, etc.

According to the Mode 2 resource allocation, also termed UE-autonomous resource selection, a UE is adapted to select the radio resources on its own, e.g., from the available radio resource pools, in order to be able to transmit the control information (SA message) and user data via a direct sidelink connection. As mentioned before, the first embodiment additionally provides a resource allocation method which is able to take into account the location of the vehicular UE. This could be implemented exemplarily in the first embodiment by providing different radio resource pools for different possible locations of the vehicular UE. In particular, a plurality of radio resource pools would then have to be configured in the vehicular UE, each one of which would be associated with a different location in which a vehicular UE can be located. Correspondingly, at the time when the vehicular UE needs to determine radio resources, and after determining its own location, the vehicular UE will first determine which radio resource pool to use, namely that one which is associated with the determined vehicular UE location, and then will select appropriate radio resources from that associated radio resource pool for transmitting the scheduling assignment and the data.

The configuration of the plurality of radio resource pools in the vehicular UE(s) mentioned above may be under control of the eNodeB. Correspondingly, the eNodeB has to provide the vehicular UE(s) with the necessary information on the plurality of radio resource pools and their respective association with potential vehicular UE locations. According to one implementation of the first embodiment, the radio resource pools may be explicitly notified to the vehicular UEs, e.g., as a table identifying the radio resources and the associated location. The following exemplary table is presented in said respect, which assumes that x different radio resource pools are defined. The parameter x of course may vary depending on the size of the radio cell under control of the eNodeB, the available radio resources that the eNodeB intends to make available to vehicular UEs in its radio cell, and possibly also other conditions including traffic types/speed, etc.

TABLE 1

| Location | Radio Resource Pool |
| --- | --- |
| Position 1 | Offset1; Number of PRBs; PRB-Start; PRB-end |
| Position 2 | Offset2; Number of PRBs; PRB-Start; PRB-end |
| Position 3 | Offset3; Number of PRBs; PRB-Start; PRB-end |
| ... | ... |
| Position x | Offsetx; Number of PRBs; PRB-Start; PRB-end |

Correspondingly, such a table may be provided by the eNodeB to the various vehicular UEs in its radio cell, e.g., as part of the system information (if the eNodeB would like to configure all vehicular UEs in its cell in the same manner) or alternatively/additionally within a message dedicated to particular vehicular UEs.

As a further improvement, it may be possible to transmit common values, such as the number of PRBs, only once instead of transmitting same for each and every resource pool, thereby reducing the amount of data that the eNodeB has to transmit to the vehicular UE(s).

As an alternative to providing so much information about the radio resource pools from the eNodeB to the vehicular UE(s), alternative implementations of the first embodiment provide that the vehicular UEs themselves shall be able to determine the radio resource pools and the associated locations. This may be done by the use of a set of rules which may divide a large pool of resources in several radio resource pools associated with different locations. For instance, the vehicular UE may sequentially assign a fixed amount of radio resources from a larger pool of radio resources to particular locations, thereby generating different radio resource pools for different locations. This could look like a physical grid of resources where in the simplest form each portion of grid represents a part from the whole available pool of resources such that the adjoining portion of the grid represents the next part from the whole available pool of resources and so on.

According to further implementations of the first embodiment, the resource allocation shall be further improved by providing the vehicular UE with a sensing capability of radio resources as will be explained in the following. The exemplary term "sensing capability" shall be broadly understood as the capability of a vehicular UE to determine whether candidate radio resources (i.e., radio resources that may be used for the vehicular communication) are or will be used by other (vehicular) UEs or not, in order to then, if possible, not use these "blocked" radio resources to avoid corresponding collisions with the other (vehicular) UEs. Rather, the vehicular UE shall use, if possible, other radio resources which are determined to not be already in use by another (vehicular) UE. This sensing capability can be applied by the vehicular UE for both Mode 1 and Mode 2 resource allocations and on top of the additional consideration of the vehicle location when determining the radio resources as explained above in detail.

In general, sensing provides various benefits. For instance, a sensing based collision avoidance mechanism helps reduce resource collision, e.g., when a UE reads other UE's control information in order to avoid using the same resource for its transmission. Furthermore, sensing based resource allocation and location based resource pool partitioning have significant performance gain i.e., PRR (Packet Reception Ratio) goes up significantly for resource selection/allocation method with Sensing. PRR basically describes what percentage of vehicles in a given range (e.g., 100 m.) receive the transmitted packet from the given Vehicular UE. Also, sensing reduces the number of transmissions by a UE leading to lower in-band emissions. This leads to better near far performance and saves resources.

It is exemplarily assumed that the vehicular UE is configured for Mode-2 resource allocation and additionally considers the vehicle location for the radio resource determination according to the first embodiment and thus the vehicular UE shall autonomously select radio resources from a radio resource pool which is associated with the determined location of the vehicle UE. In addition, the vehicular UE shall perform sensing so as to not use radio resources that are or will be used by another (vehicular) UE. This may be implemented in different ways. For instance, the vehicular UE will select a candidate set of radio resources from a suitable radio resource pool which is associated with its location. However before actually using the candidate set of radio resources, the vehicular UE shall first determine where these radio resources are actually blocked by another mobile terminal or not. Then, in case the radio resources are or will already be used by another mobile terminal, the vehicular UE shall repeat the process and select different radio resources from the radio resource pool, which are then again checked as to whether they are blocked or not. This process may be continued until the vehicular UE determines radio resources from the radio resource pool that are not blocked by another mobile terminal. On the other hand, the vehicular UE, before actually selecting a candidate set of radio resources from the radio resource pool, may perform the sensing on all radio resources of the radio resource pool and then eliminate/disregard those radio resources from the radio resource pool that have been determined to be or that will be in use by another UE. Correspondingly, the vehicular UE will then select radio resources from among the remaining free radio resources of the radio resource pool to be used for communication.

A further improvement of this sensing capability considers the situation that all radio resources of a radio resource pool are or will be in use by another mobile terminal, such that the vehicular UE will be blocked from performing vehicular communication for a particular time. In order to avoid this, an implementation of the first embodiment allows that the vehicular UE can select radio resources from another radio resource pool, i.e., a radio resource pool which is actually not associated with its own location but with another location. This will increase the likelihood that radio resources from this other radio resource pool will not be blocked and will enable the vehicular UE to perform the vehicular communication using said radio resources. As mentioned above, the vehicular UE may be configured with a plurality of different radio resource pools and, according to one implementation, the UE might randomly determine another radio resource pool from which select the radio resources. Alternatively, instead of randomly selecting another radio resource pool, the vehicular UE may use a radio resource pool which is associated with a location which is right next to the actual location of the vehicular UE. On the other hand, the vehicular UE may use another resource pool which is associated with a location which is further, or even further away, from the actual location of the vehicular UE. According to still another alternative, the vehicular UE may assign a relative priority to each of the available radio resource pools based on a previously determined priority assignment scheme. Then, the vehicular UE may select that radio resource pool from the remaining radio resource pools with the highest priority. For example, relative priorities may be assigned to the plurality of radio resource pools based on the distance from the actual location of the vehicular UE, such that radio resource pools associated with a nearby or further away location will be assigned a high priority.

On the other hand, when assuming Mode 1 resource allocation, the vehicular UE, after having received from the eNodeB a message indicating radio resources that shall be used by the vehicular UE for communication, shall also perform sensing on these received and instructed radio resources before actually using them for the communication. In the same manner, the vehicular UE may reach the conclusion that the instructed radio resources are or will be used by another (vehicular) UE and will thus not use them in order to avoid the collision. Rather, the vehicular UE may then again request resources from the eNodeB, or may proceed to autonomously select radio resources from a suitable radio resource pool (e.g., associated with its location) in order to avoid the delay incurred by again having to request radio resources from the eNodeB.

The vehicular UE can determine that radio resources are or will be in use in at least two different ways. According to a first implementation, the vehicular UE will measure the received signal strength (e.g., RSSI, received signal strength indication) on corresponding resource elements (REs) of candidate resources, e.g., PRBs. The received signal strength is an indication on whether these radio resources are already in use by another mobile terminal. Correspondingly, by comparing the measured received signal strength against a suitable threshold, the vehicular UE may identify radio resources that must be considered to be already in use by another UE and thus blocked for the vehicular UE. Furthermore, the vehicular UE may continue measuring the received signal strength for the candidate resources and thus determine when the other UE will stop using them, or will simply assume that these radio resources are blocked for a particular period of time (e.g., determined statistically from previously monitoring the radio resources or as being instructed by the network via corresponding RRC signaling) without having to actually continue measuring the received signal strength for those radio resources.

According to the second implementation, the vehicular UE may monitor scheduling assignment messages transmitted by other (vehicular) UEs, which indicate which radio resources will be used for transmitting the data. Correspondingly, the vehicular UE will thus learn which radio resources will be used by other mobile terminals. Furthermore, the SA messages may also indicate a period during which the radio resources will be repeatedly used, thus allowing the vehicular UE to determine blocked radio resources in the future.

These two different implementations on how the vehicular UE can determine whether radio resources are blocked or not, can be used in parallel or separately from one another, or only one of them may be used by the vehicular UE.

In general, additionally including the process of sensing by the vehicular UE before actually using radio resources is especially advantageous in those scenarios where radio resource collisions are likely to happen. Although not discussed so far, depending on how precise the possible vehicle locations are differentiated from one another, at a particular location there may be only one vehicular UE or substantially more than one vehicular UE. For instance, it is assumed that a radio resource pool is associated with a particular location (area) in which several vehicular UEs could be located at the same time, such that the several vehicular UEs could at the same or similar time select radio resources from this radio resource pool thereby increasing the likelihood of selecting the same radio resources and thus causing a collision. By implementing this sensing capability in the vehicular UEs, some of these collisions will be avoided thereby increasing the throughput in the vehicular communication and avoiding retransmissions.

According to the previously explained broad embodiment, it was assumed that the vehicular UE determines its location and use the same for determining the radio resources (either using Mode 1 or Mode 2 radio resource allocation). As will be explained in the following, some implementations of the first embodiment focus on how the location of the vehicular UE can be represented in an efficient manner.

According to one possible way, the vehicular UE location may be expressed as geographical coordinates, which can be derived in a known manner, e.g., based on GPS satellites. The geographical coordinates would at least include values for the longitude and latitude, e.g., in decimal degrees or in degrees, minutes, and seconds. In this case, the vehicular UE will determine its geographical coordinates and will then take these geographical coordinates into account when determining the necessary radio resources. For instance, for Mode 1 resource allocation, the vehicular UE will transmit these geographical coordinates to the eNodeB, which in turn would use them for selecting appropriate radio resources, and for sending a corresponding message with the scheduled radio resources back to the vehicular UE. For Mode 2 resource allocation, the UE would compare its determined location with the geographical coordinates associated with the different radio resource pools and might then select that radio resource pool which is associated with geographical coordinates nearest to the ones of the vehicle.

Figure 9A:
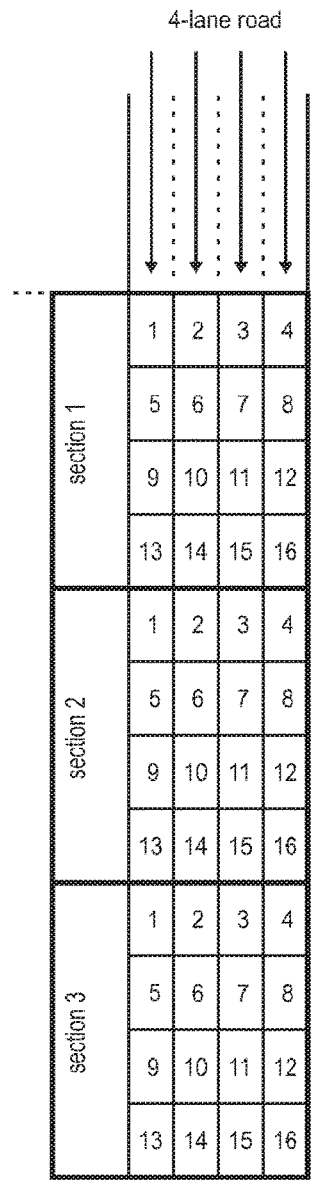
Figure 9B:
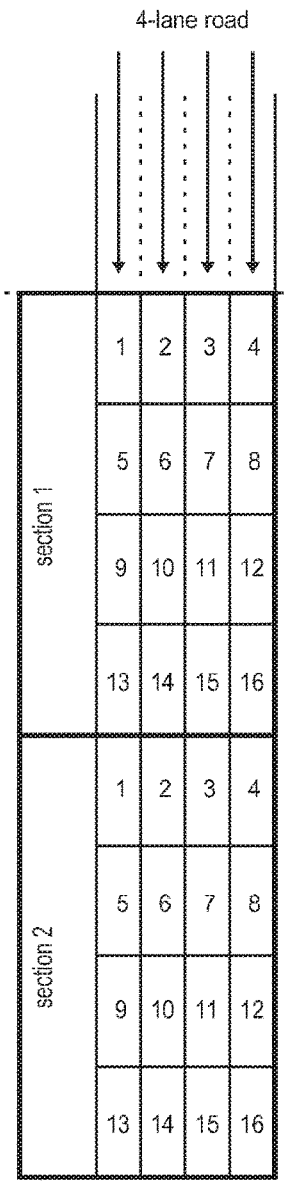
Figure 9C:
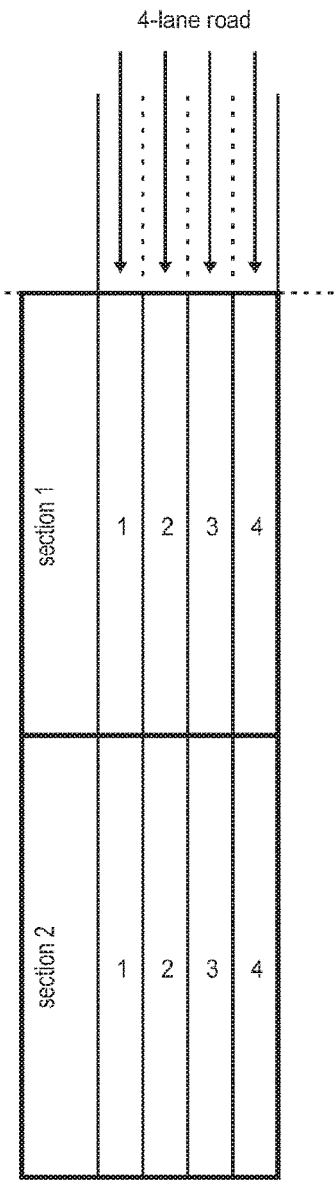

According to another implementation of the first embodiment, the vehicular location will be represented completely different, namely as a function of sections and/or subsections into which a road is divided. This will be explained with reference to FIGS. 9A, 9B, and 9C which illustrate exemplary divisions of a road into sections and subsections. Each of these figures is exemplarily based on a 4-lane road, where all 4 lanes are supposed to carry traffic going in the same direction. As illustrated in these figures, there are many possibilities on how a part of the road can be divided into different sections and subsections. For FIGS. 9A, 9B and 9C it is exemplarily assumed that each section covers all of the lanes of the road, although this does not need to be the case. Furthermore, the same stretch of a road can be divided into a different number of sections, where the different sections then would differ in their length. In turn, also the subdivision of these sections into subsections can be performed in many different ways. For instance, in FIGS. 9A and 9B it is exemplarily assumed that 16 different subsections are provided as illustrated. On the other hand, according to FIG. 9C, the subsections are supposed to cover only one lane but are the same length as the section thus resulting in fewer subsections.

How the sections and the subsections are set up may be decided by a suitable entity in the mobile communication system, such as the one that is also responsible to decide which radio resource allocation method to use (e.g., the eNodeB, the MME, or a ProSe related entity). The length and breadth of the sections and subsections may be decided by this entity, which may consider different parameters in said respect. In the exemplarily assumed scenarios of FIGS. 9A, 9B and 9C, the breadth of the section is equal to the breadth of the road, while the breadth of a subsection is equal to the breadth of a lane (e.g., 4 m). The length of a subsection may depend on the speed of the vehicles that are traveling on that road, the resulting inter-vehicle distance as a function of the vehicle speed, and also on whether only one car shall be assumed per subsection or several cars per subsection. For example, in case there should be only one car per subsection, an inter-vehicle distance in the same lane of about 97 m (2.5 seconds*140 km/h, see Table A.1.2-1 of TS 36.885 for the highway scenario) could be used as the length of a subsection to ensure that only one vehicle is located in the same subsection. These are the example data for absolute vehicle speed in the freeway case. The freeway case has been selected since it represents the fastest moving traffic scenario and apparently the time to react (for the vehicle drivers for instance) is minimum in this case. So, if the fastest required latency can be met in freeway case to send critical messages across to other vehicles in freeways case, it might likely be possible in other cases as well.

On the other hand, the length of the section may be determined based on the required effective range of the vehicular communication as given in Table A.1 of TS 22.885. For instance, for the highway (Autobahn) case, the required effective range is 320 meters. Furthermore, in order to make sure that interference is mitigated between two adjoining sections, it is exemplarily assumed that twice the required effective range shall be used as the length of the section, i.e., 640 meters. In such a case, assuming the length of a section with 640 meters and assuming the length of a subsection to be about 97 meters, an exemplarily division may divide the length of a section into seven subsections each with a length of 91 meters.

Alternatively, it is also feasible to provide longer subsections in view of that the UE is supposed to make only one transmission in, e.g., 100 ms, such that it may not be efficient to occupy the whole resources of a subsection for the UE also for the remaining 99 ms. In said case, by increasing the length of the subsections it is possible to have more than one vehicular UE in a subsection. This is exemplarily illustrated in FIG. 9C, which has subsections having the same length as the section. Correspondingly, when exemplarily assuming Mode 2 resource allocation, a subsection would still be associated with a radio resource pool, and the vehicular UEs located in that subsection will randomly select radio resources from the same radio resource pool associated with that subsection to perform vehicular communication. This is also a scenario where it is particularly advantageous to also apply the additional sensing described above since several UEs are selecting radio resources from the same radio resource pool and may thus cause a collision; which can be avoided by having the vehicular UEs first determine whether radio resources are or will be free before actually using them.

As exemplarily explained above, a road may thus be divided into sections and subsections of particular length and breadth. Furthermore, it is assumed that each section, at least for a particular area, should be divided in the same manner into subsections, as illustrated in the respective FIGS. 9A, 9B, and 9C. Put differently, a road is thus divided into various subsequent sections that are in turn subdivided in the same manner into subsections.

Each of the subsections may then be associated with (different) radio resources, such that the radio resources of a particular vehicular UE can be determined by taking also the location of the vehicular UE (i.e., the section/subsection) into account. For example, when assuming Mode 2 resource allocation, each subsection could be associated with a different radio resource pool. An exemplary association is illustrated in the following table, which is similar to the previously-discussed table where the radio resource pools are more generally associated with the vehicle locations.

TABLE 2

| Location | Radio Resource Pool |
| --- | --- |
| Subsection 1 | Offset1; Number of PRBs; PRB-Start; PRB-end |
| Subsection 2 | Offset2; Number of PRBs; PRB-Start; PRB-end |
| Subsection 3 | Offset3; Number of PRBs; PRB-Start; PRB-end |
| ... | ... |
| Subsection x | Offsetx; Number of PRBs; PRB-Start; PRB-end |

As apparent from the above table, it suffices for the vehicular UE to determine the subsection it is in, considering that each section is divided in the same manner into subsections which are then equally associated with the same radio resource pools. Thus, although the vehicular UE could also use the section (e.g., to possibly further differentiate between different radio resource pools), this is actually not necessary with the above assumptions.

The radio resources in the plurality of radio resource pools to be distributed among the subsections of each section may be selected such that interference between them is mitigated. Correspondingly, vehicular UEs located in adjoining subsections and thus using the respective resources associated to that subsections should not cause interference when communicating at the same time.

Based on the above described grid of sections and subsections which is overlaid over each road, the vehicular UEs have to determine in which section/subsection they are in so as to then either use this information on their own when selecting autonomously the radio resources from radio resource pools (i.e., Mode2) or to provide this information to the eNodeB which in turn can then determine the radio resources based thereon (Mode 1).

Correspondingly, the vehicular UEs will start by determining their geographical location so as to then identify the section and/or subsection which corresponds to that geographical location. Therefore, the vehicular UEs need to know about how the road is exactly divided into sections and subsections, e.g., they need to know about the size of the section and the number and size of the various subsections into which each section is divided. Furthermore, the vehicle UEs may also need to know where exactly the grid (i.e., sections/subsections) starts for a particular road that they are traveling on. This information for instance can be provided in the form of boundaries given by particular geographical coordinates identifying the start and/or the end of roads. Therefore, a road shall be unambiguously divided into sections and subsections, such that all the vehicular UEs and also the eNodeB have the same understanding of where the sections and subsections are located and start and end.

Also, the vehicular UE shall adapt the grid and the corresponding sections and subsections such that they still align with the road even when the road has curves.

It should be further noted, that the vehicular UE may be connected to the navigation system of the vehicle and may thus have access to map data which assists the vehicular UE in determining the boundaries of the road and how the road is divided into sections and/or subsections.

According to a further exemplary implementation, based on the map information that is available from the navigational system of the vehicle, the vehicular UE should at least have access/knowledge of a road start/end, the co-ordinates of the edges of the road, number of lanes in each direction, etc. On top of this it could apply the following functions to calculate its section/subsection. For the following, the UE could use either the Decimal Degrees (DD) or the DMS values
(https://en.wikipedia.org/wiki/Decimal_degrees)

A 'unit' each for the length and width of the section/subsection can be signaled in the Broadcast message, e.g., 0° 00'0.036" representing 1.1132 m. The network can signal that x' unit of latitude/, y' unit of longitude constitute one section/subsection, additionally based on the boundary Information of the road.

The above described implementations of the first embodiment implicitly assumed that the vehicular UE is in coverage of the eNodeB. However, a vehicular UE can also be out of coverage of the eNodeB and shall still be able to perform vehicular communication. Correspondingly, a further implementation of the first embodiment takes this into account by specifying at a vehicular UE which is out of coverage shall use the usual D2D resource allocation method without additionally considering its vehicle location when determining the radio resources. For instance, the random radio resource selection should be reliable enough, especially taking into account that in areas where a particular vehicular UE is out of coverage should not have a lot of vehicles in the first place thus reducing the likelihood of a collision and thus causing the benefits from additionally considering the vehicle location to be minimal.

Second Embodiment

In the following a second embodiment is presented which deals with the same problem as the one solved by the first embodiment, i.e., the one explained at the beginning of the detailed description namely to improve the radio resource allocation for vehicular communication. The second embodiment is in many aspects similar to the first embodiment and references to the first embodiment will be often used.

As was explained above for the first embodiment, a central feature was that the first embodiment provided an additional, improved, resource allocation method capable of additionally taking the location of the vehicular UE into account. Furthermore, as a further, optional, improvement to this location-assisted resource allocation, the first embodiment allowed the vehicular UE to perform sensing on the allocated radio resources before actually using them so as to avoid collisions on radio resources that are or will be in use by another UE.

According to the second embodiment, the central feature of the additional, improved, resource allocation method is the additional sensing capability of the vehicular UE(s), while the feature of assisting the resource allocation by the vehicular UE location remains optional.

In more detail, the radio resource allocation according to the second embodiment is also based on the radio resource allocation as already defined for D2D communication, thus allowing Mode 1 and Mode 2 resource allocations as explained in the background section. Similar to the first embodiment, the second embodiment additionally distinguishes between two different resource allocations, differing in that the vehicular UE additionally performs sensing on the determined radio resources before actually using them.

As explained in detail for the first embodiment, the term sensing capability shall be broadly understood as the capability of a vehicular UE to determine whether candidate radio resources are or will be used by other UEs or not. Then, these blocked radio resources shall, if possible, not be used so as to avoid corresponding collisions with these other UEs. This sensing capability can be applied by the vehicular UEs for both Mode 1 and Mode 2 resource allocations.

In particular, it is exemplarily assumed that the vehicular UE is configured for Mode-2 resource allocation, where the UE autonomously selects radio resources from a suitable radio resource pool. In addition, the vehicular UE shall perform sensing so as to not use radio resources that are or will be used by another UE. As explained in the first embodiment, the vehicular UE may first select a candidate set of radio resources from a suitable radio resource pool and then determine whether these selected candidate set of radio resources is actually used by another mobile terminal or not. In case the radio resources are blocked, the vehicular UE shall select other resources from the radio resource pool and shall again perform the sensing procedure to make sure that these radio resources are free to use. On the other hand, the vehicular UE, before actually selecting a candidate set of radio resources from the radio resource pool, may perform the sensing on all radio resources of the radio resource pool so as to eliminate/disregard those radio resources that are or will be in use by another mobile terminal. As a result, the vehicular UE will then select radio resources from among the remaining free radio resources of the radio resource pool.

A further improvement to the sensing procedure is presented in the following for the situation where all radio resources of a radio resource pool are or will be in use by another mobile terminal. In a similar manner as already explained for the first embodiment, the vehicular UE shall be able to select radio resources from another radio resource pool in case no free radio resources are available. This other radio resource pool may be still among the many resource pool configured by the network for use of V2X communication. In case if there is only one resource pool configured, or, if the last configured resource pool also turns out to be completely blocked, then this vehicular UE must simply wait and try again after some specified time duration.

On the other hand, the second embodiment is also applicable to the Mode 1 resource allocation, where the vehicular UE has to request radio resources from the eNodeB by transmitting a scheduling request and possibly a buffer status report to the eNodeB. In response, the eNodeB will determine suitable radio resources and will provide the vehicular UE with a corresponding indication of the radio resources that are to be used. According to the second embodiment, the vehicular UE will determine whether the radio resources allocated by the eNodeB are or will be used by another (vehicular) UE, and will not use them in case there are blocked so as to avoid the collision. Rather, the vehicular UE may then again request further radio resources from the eNodeB, or may proceed to autonomously select radio resources from a suitable radio resource pool (i.e., Mode 2) so as to avoid the delay incurred by having to again request radio resources from the eNodeB.

As explained in detail for the first embodiment, there are at least two possible ways that the vehicular UE can determine whether radio resources will be blocked by another UE, and thus reference is made to the corresponding passages of the first embodiment. In brief, the vehicular UE may measure that received signal strength and compare same to a threshold, so as to then determine that radio resources are already in use in case the received signal strength is larger than the threshold. Alternatively, or in addition, the vehicular UE may monitor scheduling assignment messages transmitted by other vehicular UEs so as to collect information on which radio resources will be used by other UEs and thus will be blocked from being used by the vehicular UE.

Additionally including the sensing procedure for the radio resource allocation is especially advantageous in scenarios where radio resource collisions are likely to happen. This may be the case when a radio resource pool is relatively small but used by many vehicular UEs, e.g., in situations where many vehicular UEs are located side-by-side, such as in a traffic jam.

After having explained the sensing capability of the vehicular UE in detail, the second embodiment shall make use of the sensing capability in a selective way. In a similar manner as in the first embodiment, an entity of the mobile communication system, such as the eNodeB, the MME, or a ProSe-related entity in the core network, can take a decision on whether to use a normal D2D resource allocation method or whether to use the improved sensing-assisted resource allocation method introduced with the second embodiment. The responsible entity, for ease of explanation assumed to be the eNodeB, can take the decision based on different information. For instance, the eNodeB can take the topology of the particular area of its cell into account (e.g., highway or city center or rural, etc.), as well as the number and speed of vehicles in the particular area. Furthermore, whether to use the sensing-assisted resource allocation or without sensing-assistance may also depend on the time, for instance peak hours where the traffic is usually dense while at other times the traffic situation is different.

Consequently, the eNodeB will selectively decide whether to use one or the other resource allocation method, i.e., whether to use or not use the additional capability of sensing so as to avoid collisions. In accordance therewith, the vehicular UE is to be provided with information from which it may deduce which resource allocation method to use. As already explained for the first embodiment, this may be done in various ways, also depending on whether the eNodeB takes the same decision for all vehicular UEs in its cell or not. An explicit information (e.g., flag) can be used in said respect, being broadcast in its radio cell or being transmitted in dedicated messages to particular vehicular UEs. Alternatively, or in addition, instead of providing an explicit instruction to the vehicular UE, it may also be possible for the vehicular UE to derive from internal parameters which resource allocation method to use. In particular, in order to perform the sensing it may be necessary that the UE is provided with particular parameters such as the thresholds for the comparison of the received signal strength or the periodicity with which the UE shall monitor for SA messages.

Optionally, the SA message itself might contain information about the period of intended use of the resources, e.g., in next few TTIs or control/data cycles, etc., called here as the "Busy-ness" period. In this respect, individual candidate SA messages (PSCCH) would be received and decoded and the vehicular mobile terminal can check if these indicate any future "busy-ness" in coming control/Data cycles. If an individual candidate SA is not being transmitted currently, the vehicular UE could assume the control (SA) and the corresponding Data resources as "free". The "busy-ness" in SA message may also indicate a corresponding period of busy-ness during which it intends to keep transmitting on the corresponding control/Data resources. In the simplest form it will be a Boolean value indicating "busy-ness" period as 1 cycle or some other 'fixed' number of Cycles.

In any case, according to the various implementations of the second embodiment, each of the vehicular UEs shall know at any time whether to use one or the other of the two resource allocation methods, i.e., whether to apply sensing or not in addition.

Furthermore, the second embodiment may be also enhanced, on top of the sensing capability, by assisting the radio resource allocation with the location of the vehicular UE. As was explained in detail for the first embodiment, the vehicular UEs may determine its location and use said location in the process of determining the radio resources for communication with the other mobile terminals. Correspondingly, particular implementations of the second embodiment combine the sensing capability as well as the location-assisted resource allocation as explained for the first embodiment. In order to avoid repetition, reference is made to the particular passages of the first embodiment dealing in detail with the various different implementations of the first embodiment regarding how the vehicular UE location can be determined by the UEs (either as simple geographical coordinates or as a function of subsections of a road), how the vehicular UE location can be used when determining the radio resources either in Mode 1 or Mode 2, how the vehicular UE location can be expressed as geographical coordinates or as a function of sections and/or subsections of a road, how a road can be divided into sections/subsections, how the vehicular UE location can be transmitted to the eNodeB for the Mode 1 resource allocation, etc.

Hardware and Software Implementation of the Present Disclosure

Other exemplary embodiments relate to the implementation of the above described various embodiments using hardware, software, or software in cooperation with hardware. In this connection a user terminal (mobile terminal) is provided. The user terminal is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A communication apparatus, comprising:
reception circuitry, which, in operation, receives parameter information in a cell in which the communication apparatus is located; and
control circuitry, which is coupled to the reception circuitry and which, in operation, determines, based on the parameter information, whether to use radio resources which correspond to a geographical location of the communication apparatus,
wherein, responsive to the parameter information indicating to use radio resources which correspond to a geographical location of the communication apparatus, the control circuitry:
determines the geographical location of the communication apparatus,
identifies a location subsection in which the communication apparatus is geographically located based on the parameter information, wherein the parameter information includes a first parameter indicative of a length of the location subsection, a second parameter indicative of a width of the location subsection, a third parameter indicative of a number of location subsections with respect to the length in longitude into which a location section is divided, and a fourth parameter indicative of a number of location subsections with respect to the width in latitude into which the location section is divided, wherein the first to fourth parameters are dynamically signaled from a radio base station,
dynamically determines radio resources, which correspond to the identified location subsection in which the communication apparatus is geographically located, based on the length and width of the location subsection indicated by the first and second parameters and the numbers of location subsections into which the location section is divided with respect to longitude and latitude indicated by the third and fourth parameters, and
performs communication using the determined radio resources.

2. The communication apparatus according to claim 1, wherein the control circuitry determines to use radio resources in a radio resource pool which is associated with the identified location subsection.

3. The communication apparatus according to claim 1, which is configured with a plurality of radio resource pools associated with different geographical locations in which the communication apparatus can be located,
wherein,
the configuration of the radio resource pools is transmitted to the communication apparatus, and
the configuration of the radio resource pools is defined by explicit information on the radio resource pools and respective radio resources in each radio resource pool, or by rules defining how radio resources are divided into the radio resource pools.

4. The communication apparatus according to claim 1, wherein the control circuitry determines to use radio resources by:
requesting radio resources from the radio base station,
transmitting information on the determined geographical location of the communication apparatus to the radio base station, wherein the information on the determined geographical location is geographical coordinates or an identifier of a location section in which the communication apparatus is geographically located, and receiving from the radio base station an indication of radio resources to be used.

5. The communication apparatus according to claim 1, wherein the control circuitry, in operation, determines, based on signaling from the radio base station or sensing by the communication apparatus, whether potential radio resources are or will be used by another communication apparatus, and responsive to determining the potential radio resources are or will be used by the another communication apparatus, determines not to use the potential radio resources and determines to use different radio resources.

6. The communication apparatus according to claim 5, wherein the control circuitry determines to use radio resources by:

determining radio resources in a radio resource pool which is associated with the geographical location of the communication apparatus, and responsive to determining that the potential radio resources in the radio resource pool are or will be used by another communication apparatus, determining to use radio resources in another radio resource pool which is associated with another geographical location different from the geographical location of the communication apparatus, wherein the another geographical location is adjacent to the geographical location of the communication apparatus.

7. The communication apparatus according to claim 1, wherein, the geographical location of the communication apparatus is defined by a grid overlaying a road on which the communication apparatus is located, the road is divided into a plurality of location sections, and each of the plurality of location sections covers all lanes in the road, all of the plurality of location sections are subdivided into a same number of non-overlapping location subsections, and each of the location subsections covers at least one of the lanes in the road, and each of the location subsections is associated with a radio resource pool.

8. The communication apparatus according to claim 7, wherein the radio resources associated with the location subsections, respectively, are orthogonal to each other to mitigate interference.

9. The communication apparatus according to claim 1, wherein the control circuitry determines the geographic location of the communication apparatus by determining an identifier of the location section and/or an identifier of the location subsection in which the communication apparatus is geographically located.

10. The communication apparatus according to claim 1, wherein the control circuitry, in operation, determines whether the communication apparatus is in coverage or out of coverage of the radio base station, and responsive to determining the communication apparatus is out of coverage, determines not to use radio resources which correspond to the geographic location of the communication apparatus.

11. A method performed by a communication apparatus, the method comprising:

receiving parameter information in a cell in which the communication apparatus is located;

determining, based on the parameter information, whether to use radio resources which correspond to a geographical location of the communication apparatus;

responsive to the parameter information indicating to use radio resources which correspond to a geographical location of the communication apparatus, determining the geographical location of the communication apparatus, identifying a location subsection in which the communication apparatus is geographically located based on the parameter information, wherein the parameter information includes a first parameter indicative of a length of the location subsection, a second parameter indicative of a width of the location subsection, a third parameter indicative of a number of location subsections with respect to the length in longitude into which a location section is divided, and a fourth parameter indicative of a number of location subsections with respect to the width in latitude into which the location section is divided, wherein the first to fourth parameters are dynamically signaled from a radio base station, dynamically determining radio resources, which correspond to the identified location subsection in which the communication apparatus is geographically located, based on the length and width of the location subsection indicated by the first and second parameters and the numbers of location subsections into which the location section is divided with respect to longitude and latitude indicated by the third and fourth parameters, and performing communication using the determined radio resources.

* * * * *